(12) United States Patent
Bromand

(10) Patent No.: US 10,943,581 B2
(45) Date of Patent: Mar. 9, 2021

(54) TRAINING AND TESTING UTTERANCE-BASED FRAMEWORKS

(71) Applicant: Spotify AB, Stockholm (SE)

(72) Inventor: Daniel Bromand, Stockholm (SE)

(73) Assignee: Spotify AB, Stockholm (SE)

( * ) Notice: Subject to any disclaimer, the term of this patent is extended or adjusted under 35 U.S.C. 154(b) by 0 days.

(21) Appl. No.: 16/168,478

(22) Filed: Oct. 23, 2018

(65) Prior Publication Data

US 2019/0318722 A1 Oct. 17, 2019

(30) Foreign Application Priority Data

Apr. 12, 2018 (EP) .................................. 18167001

(51) Int. Cl.
| | | |
|---|---|---|
| G10L 15/06 | (2013.01) | |
| G06F 7/58 | (2006.01) | |
| G10L 13/02 | (2013.01) | |
| G10L 15/07 | (2013.01) | |

(52) U.S. Cl.
CPC ............ *G10L 15/063* (2013.01); *G06F 7/582* (2013.01); *G10L 13/02* (2013.01); *G10L 15/07* (2013.01); *G10L 2015/0635* (2013.01)

(58) Field of Classification Search
CPC ..................................................... G10L 15/06
See application file for complete search history.

(56) References Cited

U.S. PATENT DOCUMENTS

| | | |
|---|---|---|
| 5,796,916 A | 8/1998 | Meredith |
| 6,141,644 A | 10/2000 | Kuhn et al. |
| 7,096,183 B2 | 8/2006 | Junqua |
| 7,567,896 B2 | 7/2009 | Coorman et al. |
| 7,574,359 B2 | 8/2009 | Huang |
| 9,098,467 B1 | 8/2015 | Blanksteen et al. |
| 9,613,620 B2 * | 4/2017 | Agiomyrgiannakis ...................... G10L 15/07 |
| 9,852,729 B2 | 12/2017 | Hoffmeister |

(Continued)

FOREIGN PATENT DOCUMENTS

EP    1079615 A3    9/2002

OTHER PUBLICATIONS

Dosovitskiy et al., "Learning to Generate Chairs with Convolutional Neural Networks", IEEE Transactions On Pattern Analysis and Machine Intelligence, pp. 1538-1546 (Nov. 21, 2014).

(Continued)

*Primary Examiner* — Michael N Opsasnick
(74) *Attorney, Agent, or Firm* — Merchant & Gould P.C.

(57) ABSTRACT

Systems, methods, and devices for training and testing utterance based frameworks are disclosed. The training and testing can be conducting using synthetic utterance samples in addition to natural utterance samples. The synthetic utterance samples can be generated based on a vector space representation of natural utterances. In one method, a synthetic weight vector associated with a vector space is generated. An average representation of the vector space is added to the synthetic weight vector to form a synthetic feature vector. The synthetic feature vector is used to generate a synthetic voice sample. The synthetic voice sample is provided to the utterance-based framework as at least one of a testing or training sample.

33 Claims, 10 Drawing Sheets

(56) References Cited

U.S. PATENT DOCUMENTS

| | | | |
|---|---|---|---|
| 2001/0042082 A1* | 11/2001 | Ueguri | G06F 16/957 715/201 |
| 2003/0023442 A1* | 1/2003 | Akabane | G06Q 30/06 704/260 |
| 2003/0113002 A1 | 6/2003 | Philomin et al. | |
| 2003/0171930 A1* | 9/2003 | Junqua | G07C 9/00103 704/275 |
| 2006/0085187 A1* | 4/2006 | Barquilla | G10L 13/08 704/243 |
| 2006/0161437 A1* | 7/2006 | Akabane | G06Q 30/06 704/260 |
| 2008/0112542 A1* | 5/2008 | Sharma | H04M 3/242 379/1.02 |
| 2008/0115112 A1* | 5/2008 | Sharma | H04M 3/242 717/126 |
| 2010/0169093 A1* | 7/2010 | Washio | G10L 15/063 704/243 |
| 2011/0293076 A1* | 12/2011 | Sharma | H04M 3/242 379/10.01 |
| 2015/0301796 A1 | 10/2015 | Visser et al. | |
| 2016/0072945 A1* | 3/2016 | Kulkarni | H04M 3/42221 379/88.01 |
| 2016/0358600 A1* | 12/2016 | Nallasamy | G10L 15/07 |
| 2016/0379622 A1* | 12/2016 | Patel | G10L 13/06 704/260 |
| 2017/0162186 A1* | 6/2017 | Tamura | G10L 13/027 |
| 2017/0169811 A1* | 6/2017 | Sabbavarapu | G10L 13/08 |
| 2017/0270907 A1* | 9/2017 | Mori | G10L 13/047 |
| 2018/0005628 A1 | 1/2018 | Xue | |
| 2018/0012593 A1 | 1/2018 | Prasad et al. | |
| 2019/0066656 A1* | 2/2019 | Mori | G10L 13/047 |
| 2019/0318722 A1* | 10/2019 | Bromand | G10L 15/07 |

OTHER PUBLICATIONS

Grauman et al., "Face detection and recognition" (2009). Available at: http://www.cs.unc.edu/~lazebnik/spring09/lec22_eigenfaces.pdf.

Bucilă et al., "Model Compression", KDD'06, Aug. 20-23, 2006. Available at: https://www.cs.cornell.edu/~caruana/compression.kdd06.pdf.

Prahallad, K., "Speech Technology: A Practical Introduction. Topic: Spectrogram, Cepstrum and Mel-Frequency Analysis" (2008), Carnegie Mellon University & Int'l Inst. of Info. Tech. Hyderabad. Available at: http://www.speech.cs.cmu.edu/15-492/slides/03_mfcc.pdf.

Van Dyk et al., "The Art of Data Augmentation", American Statistical Ass'n. Inst. of Mathematical Statistics, and Interface Foundation of North America Journal of Computational and Graphical Statistics, vol. 10, No. 1, pp. 1-50 (2001).

Van Den Oord, A., "Wavenet: A Generative Model for Raw Audio", SSW (2016).

Extended European Search Report from European Appl'n. No. 18167001.9, dated Oct. 17, 2018.

Shichiri et al., "Eigenvoices for HMM-Based Speech Sysnthesis", ICSLP 2002: 7th Int'l Conf. On Spoken Language Processing, Denver, CO., pp. 1269 (Sep. 16-20, 2002).

Luise Valentin Rygaard: "Using Synthesized Speech to Improve Speech Recognition for Low-Resource Languages", pp. 1-6 (Dec. 31, 2015).

Zhang et al., "Advanced Data Exploitation in Speech Analysis: An overview", IEEE Signal Processing Magazine, IEEE Service Center, Piscataway, NJ, US, vol. 34, No. 4, pp. 107-129 (Jul. 1, 2017).

\* cited by examiner

TRAINING AND TESTING UTTERANCE-BASED FRAMEWORKS

CROSS-REFERENCE TO RELATED APPLICATION

This application claims priority to European Patent Application No. 18167001.9, titled "TRAINING AND TESTING UTTERANCE-BASED FRAMEWORKS", filed Apr. 12, 2018, which is incorporated by reference herein in its entirety.

TECHNICAL FIELD

The present disclosure relates to technical solutions for generating synthetic samples and for training and testing utterance-based frameworks.

BACKGROUND

Engineers and scientists continue to struggle to determine the exact meaning of utterances on the first try. Typical utterance-based frameworks use machine learning techniques that work from imperfect matches at the outset, followed by rapid fine-tuning of provisional guesses. They crunch through large volumes of user data and attempt to learn from mistakes. The more data they collect and use, the better the machine learning models are trained resulting in more accurate matches.

In an example, an utterance-based framework determines whether an utterance includes a particular phrase (e.g., a wake word that activates a smart assistant). During training (e.g., supervised or unsupervised learning by the framework), the framework is provided with a large number of utterances as training samples. Some training samples include the particular phrase and others do not. Based on these samples, parameters of the framework (e.g., probabilities in a hidden Markov model, weights in a neural network, heuristics) are modified to affect the output provided by the framework. Once trained, the framework is provided with test samples to test the robustness (e.g., accuracy) of the framework. And once sufficiently trained, the framework is deployed in production (e.g., included as part of a product or service for end users).

There are technical challenges associated with training and testing utterance-based frameworks. One involves the acquisition of sufficient training samples to robustly train and test the framework. Another involves training speed. Particularly, acquiring training utterance samples from individuals is time consuming. Diverse training sets are useful but difficult to acquire. Further, these difficulties are compounded when attempting to acquire follow-up training samples from people based on samples associated with incorrect output. For instance, an example test uncovers that a framework has reduced accuracy for certain inputs. Determining why the framework has reduced accuracy for the certain inputs is difficult to determine, especially if the framework being tested has a black box component (e.g., as may be found in certain neural networks). And even if the exact cause were known, finding a sufficient number of people to provide sufficiently useful training and testing samples presents a challenge. These challenges affect the quality of utterance-based frameworks, and ultimately affect functionality of a final product. Further, frameworks having reduced accuracy waste significant computing resources (e.g., CPU cycles, GPU cycles, and RAM) by producing incorrect results. In addition, improvements to one or more aspects of utterance-based frameworks facilitate improvements to computing appliances. For example, utterance-based frameworks are usable to implement voice-based user interfaces. Improvements to the accuracy of the utterance-based frameworks improve the ability of a user to interact with the device. Examples and embodiments disclosed herein are relevant to overcoming one or more of these technical challenges and are relevant to improving the functioning of computers.

There exists a need for more efficient training and testing of speech-based frameworks. Oord, et al., "WaveNet: A Generative Model for Raw Audio", arXiv:1609.03499v2 (Sep. 19, 2016), describes generating raw audio waveforms using a deep neural network. The neural network can capture characteristics of speakers and switch between them based on speaker identity.

U.S. Pat. No. 7,567,896 describes corpus-based speech synthesis based on segment recombination. The patent describes a system that generates synthesized speech by concatenating speech segments from a corpus of speech segments.

U.S. Pat. No. 7,096,183 describes customizing a speaking style of a speech synthesizer using semantic analysis.

SUMMARY

The present disclosure provides methods, apparatuses, and computer readable products for associating a hardware device or software with an account based on user voice input.

In an example, there is a method for training or testing an utterance-based framework. The method includes: generating a synthetic weight vector associated with a vector space; adding an average representation of the vector space to a product of multiplying the synthetic weight vector and eigenvoices associated with the vector space, thereby forming a synthetic feature vector; generating a synthetic voice sample based on the synthetic feature vector; and providing the synthetic voice sample to the utterance-based framework as at least one of a testing or training sample.

In an example, generating the synthetic weight vector includes: obtaining one or more natural weight vectors; and applying a genetic algorithm to the one or more natural weight vectors, thereby generating the synthetic weight vector. In an example, applying the genetic algorithm to the one or more natural weight vectors includes applying crossover to two natural weight vectors, thereby generating the synthetic weight vector. In an example, generating the synthetic weight vector includes: obtaining a low-confidence natural weight vector; obtaining a high-confidence weight vector; and applying a genetic algorithm to the low-confidence natural weight vector and the high-confidence weight vector, thereby generating the synthetic weight vector. In an example, generating the synthetic weight vector includes: generating one or more pseudorandom values between a lower threshold and an upper threshold. In an example, generating the synthetic voice sample based on the synthetic feature vector includes providing the synthetic feature vectors as input to a speech synthesizer. In an example, the providing the synthetic voice sample to the utterance-based framework as the at least one of a testing or training sample includes: providing the synthetic voice sample to an activation trigger detection framework, wherein the synthetic voice sample includes a representation of a synthetic voice uttering an activation trigger. In an example, providing the synthetic voice sample to the utterance-based framework as the at least one of a testing or training sample further includes: determining a fitness of the activation trigger detection framework based on comparing an expected output of the activation trigger detection framework and an actual output of the activation trigger detection framework responsive to the synthetic voice sample being provided to the activation trigger detection framework. In an example, providing the synthetic voice sample to the utterance-based framework as the at least one of a testing or training sample further includes: adjust weights of the activation trigger detection framework based on comparing an expected output of the activation trigger detection framework and an actual output of the activation trigger detection framework responsive to the synthetic voice sample being provided to the activation trigger detection framework. In an example, providing the synthetic voice sample to the utterance-based framework comprises playing the synthetic voice sample through a speaker to an appliance having the utterance-based framework. In an example, the method further includes providing a natural sample to the utterance-based framework as at least one of a testing or training sample. In an example, generating the synthetic weight vector includes generating the synthetic weight vector based on a training sample that the utterance-based framework processed incorrectly. In an example, the method further includes: obtaining a training set of audio clips; representing each audio file of the training set of audio clips as a feature vector to form a plurality of feature vectors; generating the average representation vector from the plurality of feature vectors; subtracting the average representation vector from the plurality of feature vectors to obtain a mean-centered result; and performing singular value decomposition based on the mean-centered result to obtain eigenvoices. In an example, receiving an output from the utterance-based framework regarding whether synthetic voice sample included an activation trigger.

In an example, there is a system that includes: one or more processors; and a computer-readable storage medium coupled to the one or more processors and comprising instructions thereon that, when executed by the one or more processors, cause the one or more processors to perform any of the previously described methods.

BRIEF DESCRIPTION OF THE DRAWINGS

The features and advantages of the present disclosure will become more apparent from the detailed description set forth below when taken in conjunction with the following drawings.

DETAILED DESCRIPTION

Figure 1:
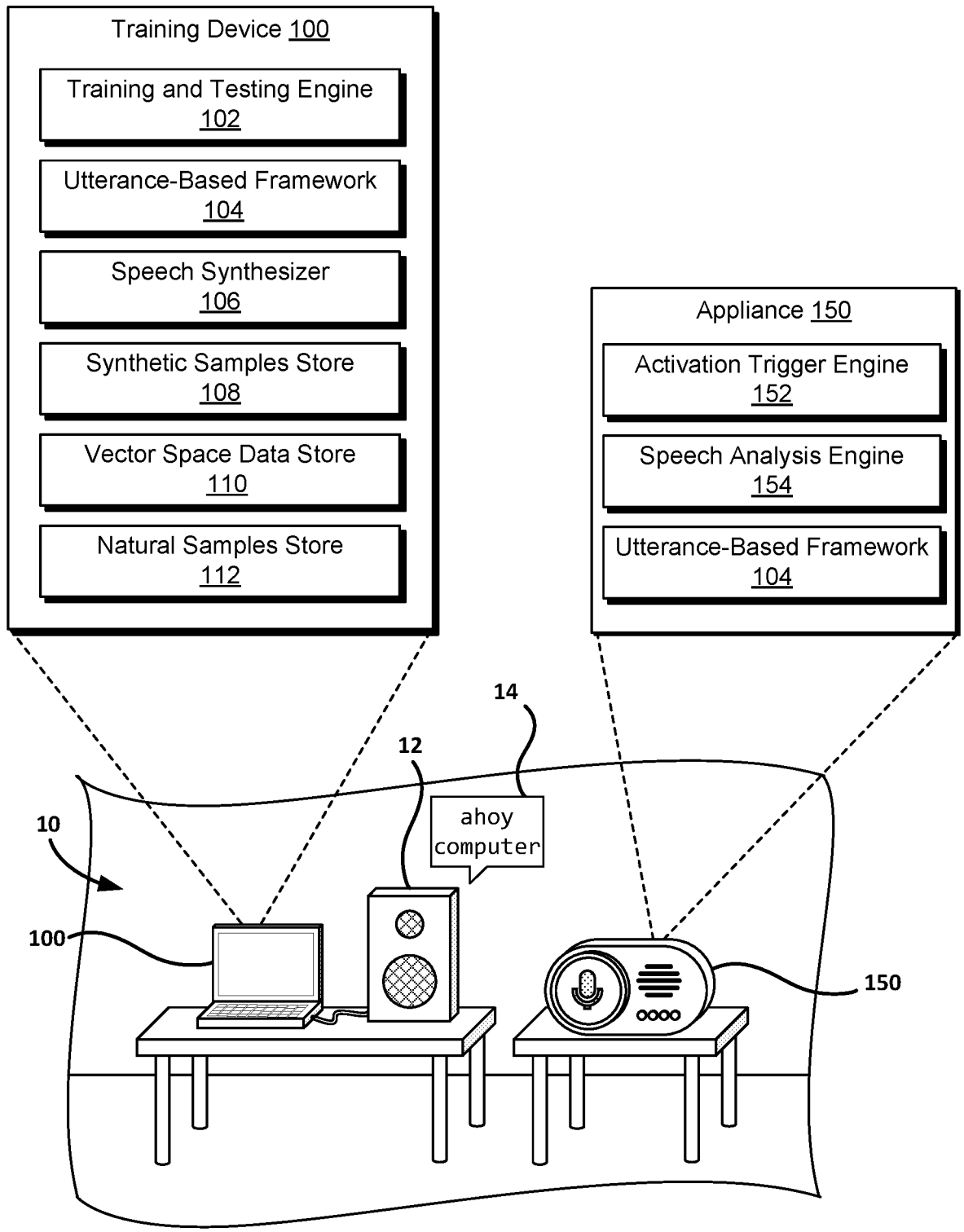
FIG. 1 illustrates an example system for training or testing utterance-based frameworks using synthetic samples.

The example embodiments presented herein are directed to systems, methods, and non-transitory computer-readable medium products for training or testing utterance-based frameworks using synthetic samples in addition to or instead of natural samples. This is for convenience only, and is not intended to limit the application of the present invention. After reading the following description, how to implement the following disclosure in alternative embodiments will be apparent to one skilled in the relevant art.

This disclosure makes reference to aspects of the training or testing process (e.g., features or items used in the process, such as voices, samples, and utterances) as being "synthetic" or "natural", such as generating a synthetic utterance or recording a natural utterance. The distinction between synthetic and natural arises from the process by which the aspect being described is formed. Natural aspects arise from a process designed to capture or preserve something naturally occurring while synthetic aspects arise from an artificial process. Accordingly, as used herein, a synthetic utterance is generated based on an artificial process.

A relevant distinction is between synthetic or natural is how attenuated the relationship between the aspect and a real person is. Using this distinction, a recording of a person saying an utterance into a microphone is a natural utterance recording because the recording arose directly from a person in a manner designed to capture or preserve the naturally occurring aspects of that person's voice. Such a recording can still be considered natural, even if it undergoes some processing (e.g., equalizer modification, compression, leveling, de-essing, noise reduction, etc.), digital conversion (e.g., analog-to-digital conversion), encoding (e.g., modifying a format or codec), or modification that nonetheless preserves the naturally occurring voice. Such a recording is still natural because although the recording underwent non-naturally occurring processing techniques, the recording still captures or preserves the naturally occurring voice (e.g., the voice would likely still be identifiable as being from that person).

Even some text-to-speech systems can be considered to produce natural samples. For instance, a voice sample generated from a text-to-speech system that generates voices by stitching together phonemes recorded by a person can be considered to be a natural voice sample under this criteria. Another indication that the recording is natural is if the recording is identifiable as being from that particular person (e.g., the voice would be recognized if a recording of the voice was played for someone who knows that person's voice).

As explained above, in general "synthetic" is used herein to refer to an aspect of the training or testing process that is artificially generated. In many examples, the synthetic aspect nonetheless imitates something natural. In general, a synthetic aspect is formed in one of two primary ways: (1) by generating the aspect without reference to a particular natural aspect; and (2) generating the aspect by sufficiently processing of one or more natural aspect.

An example of generating the aspect without reference to a particular natural aspect is generating synthetic weight vectors by generating one or more values randomly or pseudorandomly within a range of possible natural values. Because the values are generated randomly or pseudorandomly, they are without regard to a particular natural aspect, and the resulting weight vector is considered synthetic even if the values happen to correspond to or be similar to natural aspect (e.g., a weight vector that would result from a real person's voice).

An example of generating a synthetic aspect by sufficiently processing one or more natural aspects is blending two or more natural voices (e.g., blending their weight vectors together). Although derived from natural voices, the resulting voice is synthetic (e.g., distinct from each one individually). In other examples, a synthetic voice is based on a single natural voice. For example, sufficient modification of pitch or other characteristic can modify a natural voice sample sufficiently to make the resulting voice sample synthetic.

A person of skill in the art will understand additional examples and distinctions between synthetic and natural in view of the foregoing and in view of the additional disclosure herein.

Generally, the disclosed examples include systems, methods, and computer programs that provide improved operation of utterance-based frameworks by improving how they are trained and tested. Disclosed embodiments generate and use synthetic samples of utterances to train and test frameworks applied to utterances. More particularly, synthetic samples are added to training or testing sets for machine learning frameworks to reduce reliance on natural, human-provided utterances in the sets. The use of synthetic samples decreases the number of natural samples needed to train a framework, thereby improving training efficiency. The use of synthetic samples in the training process further contributes to the diversity and number of training samples and improves the robustness trained framework.

In addition, disclosed examples use vector space representations of utterances to facilitate the generation of synthetic samples. The use of vector space representations is relevant to improving generation of samples, creating a diverse number of voices, and creating synthetic samples relative to other samples, among other uses. Relative creation of samples beneficially allows the creation of synthetic samples that are similar to target samples, which creates training and testing samples that are similar to desired training targets. For instance, testing may indicate that a speech-to-text deep learning framework produces incorrect output in response to input utterances having thick accents. Synthetic samples are created based on those input utterances that were incorrectly processed, and those synthetic samples are used to train the deep learning framework. In this manner, rather than using significant resources (e.g., time, recording space, etc.) to obtain additional training samples from people, synthetic training samples are artificially generated.

Other benefits of disclosed and claimed examples are described in this specification. Additional benefits will be apparent to those of skill in the art from reading this disclosure.

System for Training or Testing Utterance-Based Frameworks Using Synthetic Samples FIG. 1 illustrates an example system 10 for training or testing utterance-based frameworks using synthetic samples. The system 10 includes, a training device 100, an appliance 150, and a speaker 12 for emitting audio, such as audio of a synthetic utterance 14. In the illustrated example, the training device 100 is used to train an utterance-based framework 104 and test the appliance 150.

Particularly, the training device 100 is a computing device that includes a training and testing engine 102, an utterance-based framework 104, a speech synthesizer 106, synthetic samples store 108, vector space data store 110, and natural samples store 112, among other hardware or software components not depicted in FIG. 1.

The training and testing engine 102 is used to train or test the utterance-based framework 104. The training and testing engine 102 collects, generates, process, and provides training samples to the utterance-based framework 104. The training and testing engine 102 also collects, generates, processes, and provides test samples the utterance-based framework 104. The training and testing engine 102 analyzes the results of the test samples, such as by comparing an expected output of the utterance-based framework 104 with an actual output.

The training and testing engine 102 further corrects deficiencies in the utterance-based framework 104 by executing remedial procedures. An example training and testing engine 102, during training, determines whether the utterance-based framework 104 provides incorrect output responsive to particular input. In an example, the utterance-based framework 104 is a speech-to-text system that outputs incorrect text more often for recordings of particularly low-pitched voices. The example training and testing engine 102 then generates synthetic samples based on those test samples that caused the incorrect output. The generated synthetic samples are then used to train the framework to correctly process recordings of low-pitched voices, thereby improving the performance of the framework. Aspects of the disclosed embodiments training and testing engine 102 are relevant to technical solutions to problems in training and testing the utterance-based framework 104.

The utterance-based framework 104 includes one or more software or hardware modules that take an action based on an utterance or other sound input. The utterance-based framework 104 is able to take a variety of different forms. In an example, the utterance-based framework 104 detects one or more aspects within speech. For instance, the utterance-based framework 104 is a framework detects an activation trigger (e.g., "ahoy computer") within audio input. In other examples, the utterance-based framework 104 provides text-to-speech services, speech-to-text services, speaker identification, intent recognition, emotion detection, or other services. The utterance-based framework 104 is configurable in a variety of ways. In many examples, the utterance-based framework 104 is a machine-learning framework, such as one or more deep-learning frameworks (e.g., neural networks), decision trees, or heuristic-based models, among others. In some examples, the utterance-based framework 104 is customized for use in or with the appliance 150. For instance, a training device 100 is provided with the utterance-based framework 104 and, once the utterance-based framework 104 is trained and tested, the utterance-based framework 104 is provided for use with the appliance 150. In the example illustrated in FIG. 1, the utterance-based framework 104 is located at the training device (e.g., for training the framework) for training and at the appliance 150 for testing.

The speech synthesizer 106 is a hardware or software component of the training device 100 that generates synthesized speech based on an input. The speech synthesizer 106 generates audio (e.g., speech waveforms) that mimics human speech from input text and provides the generated audio as output.

In an example, the speech synthesizer 106 provides customizable pronunciation. For instance, in addition to receiving input text from which the output audio is generated, the speech synthesizer 106 also receives pronunciation input. The pronunciation input includes one or more parameters that modify the pronunciation of the audio provided as output by the speech synthesizer 106. The pronunciation input affects pronunciation in a variety of ways. For instance, the speech synthesizer 106 is customizable according to the pronunciation of individual phonemes, as well as syllables and other parts of speech. The modification is also able to affect prosody of the produced speech, including but not limited to variations in duration, pitch, timbre, volume, or other qualities of components of the produced speech. The speech synthesizer 106 is able to produce speech using a variety of different technologies, including but not limited to the use of Markov models and trained neural networks.

The synthetic samples store 108 is a component storing artificial utterances that, while mimicking human speech, were generated from an artificial source, such as the speech synthesizer 106. The synthetic samples in the synthetic samples store 108 are generated for use in training the utterance-based framework 104. The synthetic samples store 108 further includes metadata regarding the samples contained therein. In an example, the metadata includes a representation of the content of the samples in a different format. For instance, a synthetic sample of the utterance "ahoy computer" includes a text representation of the utterance. In some examples, the synthetic samples are generated and stored on the training device 100 in persistent memory for later use. In some examples, the synthetic samples are transitory (e.g., existing in RAM) and used to produce the synthetic utterance 14 output from the speaker 12 but are not stored long term.

The synthetic samples store 108 represents synthetic samples in a variety of ways. In some instances, the synthetic samples are stored as audio files (e.g., in a Waveform Audio File Format encoded file, an MP3 encoded file, or other formats). In other instances, the synthetic samples stored in the synthetic samples store 108 are arranged as data structures that indicate how to generate an audio representation. For instance, the synthetic samples can be stored as speech synthesizer parameters and as text data to be synthesized. In some examples, the synthetic samples are, in turn, stored in synthetic samples store 108 as weight vectors or feature vectors, which are described in further detail herein. Storage as weight vectors facilitates efficient storage by consuming relatively little memory space.

The vector space data store 110 stores vector space and associated data. An example of the vector space data store 110 is provided in FIG. 4. The vector space data store 110 defines synthetic or natural samples in a vector space representation. In an example, the samples are defined using weights in relation to one or more eigenvoices.

The natural samples store 112 stores speech samples obtained from human subjects. Such samples are obtained in a variety of ways including but not limited to obtaining recordings of people uttering phrases. The natural samples in the natural samples store 112 are usable in a variety of ways including but not limited to creating a vector space as part of the vector space data store 110, training the speech synthesizer 106, and training the utterance-based framework 104, among others. Like the synthetic samples store 108, the natural samples store 112 can represent natural samples in a variety of ways, such as audio files or data structures describing how to generate an audio representation, among others.

In the illustrated example, the appliance 150 is a smart audio appliance for playing media content items that is controlled using a voice-based user interface, though disclosed examples can be applied to other devices having voice-enabled appliances. As illustrated, the appliance 150 is controllable using voice commands, such as synthetic utterance 14. Synthetic utterance 14 is a speech statement received at the appliance 150. Utterances and a voice-based user interface are further described in relation to FIG. 3 and FIG. 4, respectively.

In the illustrated example, the training device 100 uses a speaker 12 to emit audio of a synthetic utterance 14. As illustrated, the synthetic utterance 14 includes the phrase "ahoy computer". The appliance 150 can detect the utterance (e.g., via a microphone) and provide a response as part of a voice-based user interface. In the illustrated example, the appliance 150 includes an activation trigger engine 152, a speech analysis engine 154, and the utterance-based framework 104. The appliance 150 can use these components 104, 152, 154, among others, to analyze the synthetic utterance 14 and provide service or access based on the synthetic utterance 14. For example, in response to an utterance including the command to "log me in", the appliance 150 may determine a user associated with the utterance, and associate the appliance 150 with an account of the user.

In examples, the training device 100 and the appliance 150 include other components as well, and some components are provided by or in conjunction with other devices. An example computing device with which the training device 100 and the appliance 150 are able to be implemented is shown and described in relation to FIG. 10.

The activation trigger engine 152 and the speech analysis engine 154 are usable by the appliance to facilitate providing a voice-based user interface. The activation trigger engine 152 detects an activation trigger within the synthetic utterance 14. Responsive to detecting the activation trigger, the activation trigger engine 152 can provide at least a portion of the utterance to the speech analysis engine 154 for additional analysis. Voice based user interfaces are described in more detail in relation to FIG. 2 and FIG. 3.

Voice-Based User Interface

Software or hardware products that provide a voice-based user interface are configured to take action in response to utterances.

Figure 2:
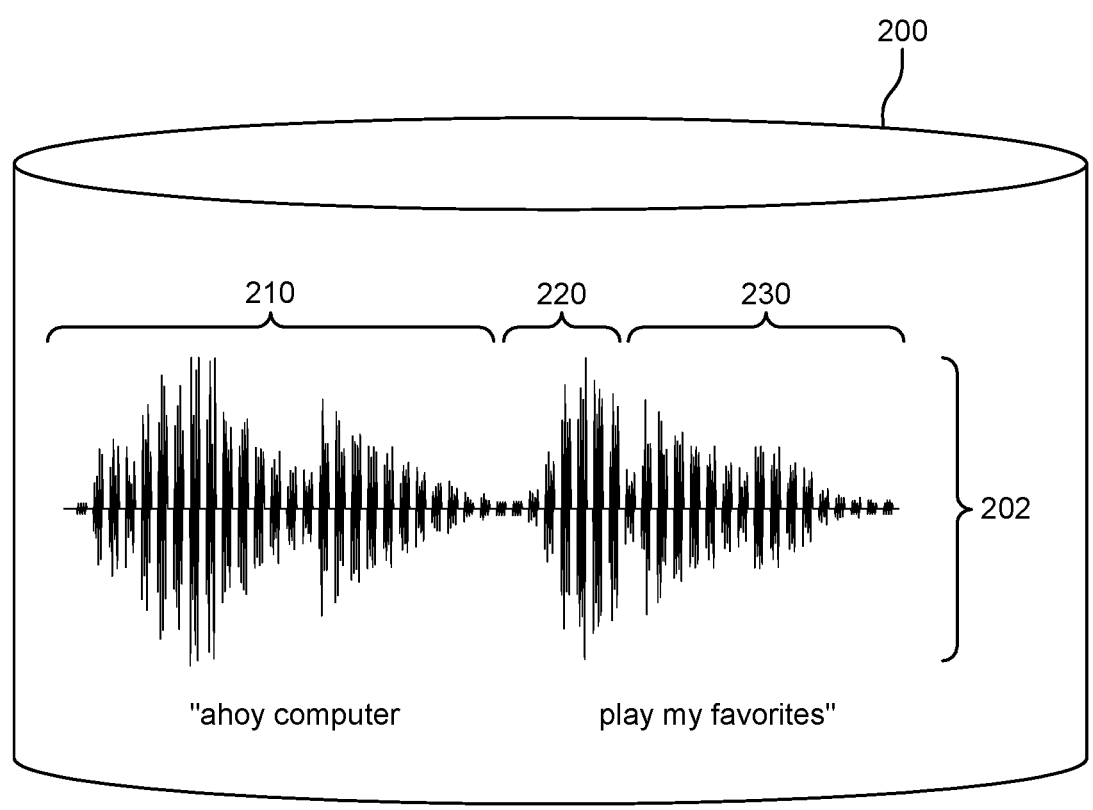
FIG. 2 illustrates an example utterance including an activation trigger portion, a command portion, and a parameter portion.

FIG. 2 illustrates an utterance data store 200 that stores an utterance 202 that includes an activation trigger portion 210, a command portion 220, and a parameter portion 230. In the illustrated example, the activation trigger portion 210 corresponds the phrase "ahoy computer", the command portion 220 corresponds to the word "play", and the parameter portion 230 corresponds the phrase "my favorites".

Utterances usable by a voice-based user interface need not include all three of these portions. For instance, the utterance "hey computer, preset one" includes an activation trigger portion ("hey computer") and a parameter portion ("preset one") but not a command portion. But the presence of a command (e.g., "play") based on the parameters or a context in which the utterance was provided. In another example, a user provides the utterance "ahoy computer", waits for confirmation that the device is listening, and then provides a command as part of a separate utterance (e.g., the query "what song were you just playing?").

In an example, the appliance 150 receives the utterance 202. Responsive to the activation trigger engine 152 detecting the activation trigger portion 210, the activation trigger engine 152 provides at least a portion of the utterance 202 to the speech analysis engine 154. The speech analysis engine processes some or all of the utterance 202 and identifies one or more of the various portions 210, 220, 230. Identifying the portions can include segmenting the utterance 202 into constituent portions based on the text content of the utterance or based on how the utterance 202 was spoken (e.g., splitting the utterance based on pauses in the utterance), among other techniques. The speech analysis engine 154 is able to determine that the utterance 202 includes the command portion 220 and determines a command associated with the command portion 220 (e.g., using natural language processing, look-up tables, or other techniques). The speech analysis engine 154 is also able to determine whether the utterance 202 includes a parameter portion 230. The determined command is then executed using the parameters in the parameter portion 230. Based on the output of the command, the device generates a response or confirmation for the user.

Voice-based user interfaces use one or more activation triggers to activate one or more capabilities of an associated device. In many instances, an activation trigger is a predetermined word or phrase spoken by the user to activate a voice-based user interface. In other instances, the activation trigger is an electronic signal received by a device in response to an event, such as the actuation of an input mechanism (e.g., a button). In still other instances, activation trigger is a signal received from another device. In some instances the activation trigger includes audio signals above or below the threshold of human hearing.

The activation trigger portion 210 serves several purposes. Activation triggers facilitate overcoming technical challenges in voice-based user interfaces. In general, voice-based user interfaces operate by listening to an ambient environment and appropriately responding to speech that the interface understands. As such, voice-based user interfaces receive all utterance in a vicinity, including those not directed to the user interface. This presents drawbacks. The use of an activation trigger provides several technical advantages, including conserving resources and protecting user privacy. Thus improvements to activation trigger detection (e.g., by improving a framework that detects activation triggers) facilitates conservation of computing resources and protection of user privacy.

Speech analysis (e.g., speech-to-text and natural language processing) in voice-based user interfaces is a relatively resource intensive process. Such resources include processor cycles, memory resources, power, network resources, combinations thereof, or other resources. Resources are wasted if the speech analysis is performed on audio other than utterances directed to the voice-based user interface. So improvements to activation trigger detection (e.g., by improving a framework that detects activation triggers) are relevant to reducing the amount of computing resources wasted on false positives.

Activation triggers also protect user privacy. Users are often wary of a device that is always listening. Limiting speech analysis to situations in which the device is activated is relevant to addressing user concerns. In addition, activation triggers reduce the risk of a voice-based user interface responding when the interface is not being directly addressed. Therefore, a benefit arises from having a speech analysis engine operating in a default mode of being inactive and then transitioning to an active mode responsive to an activation trigger engine determining that an utterance includes an activation trigger.

Figure 3:
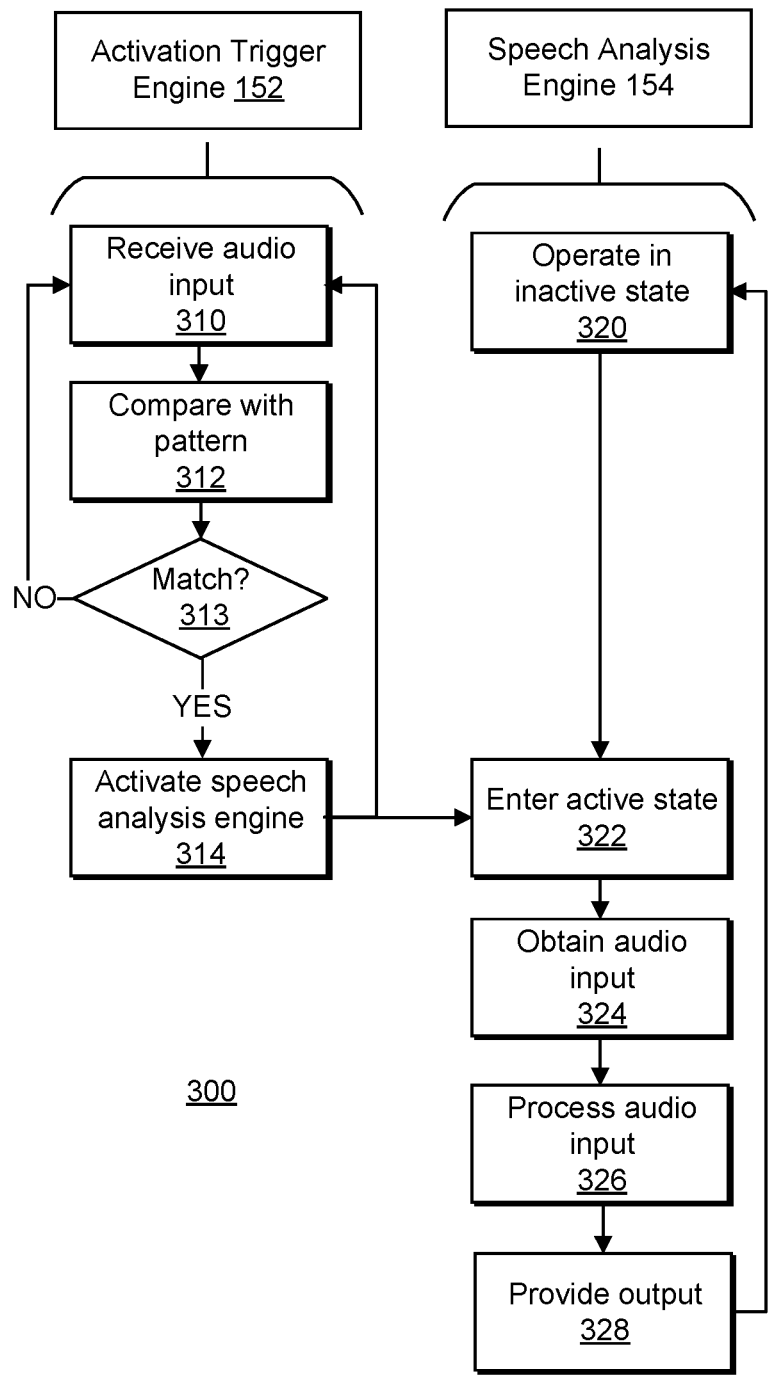
FIG. 3 illustrates an example flow diagram showing a process for providing a voice-based user interface using the activation trigger engine and the speech analysis engine.

FIG. 3 illustrates an example flow diagram showing a process 300 for providing a voice-based user interface using the activation trigger engine 152 and the speech analysis engine 154. The process 300 begins at operation 310, which involves the activation trigger engine 152 receiving audio input. In an example, the activation trigger engine 152 receives audio input from a microphone of the appliance 150 or a connection to an external audio source (e.g., a Bluetooth connection to an external microphone). The audio input can be received in a variety of ways. In some instances, the audio input is streaming audio input. In some instances, the audio input includes discrete slices of audio samples or chunked input. As will be understood, various portions of process 300 are able to occur simultaneously and various buffers or caches are usable to facilitate the comparison of data over time.

In operation 312, the activation trigger engine 152 compares the audio input with one or more patterns to determine if the audio input includes an activation trigger. In an example, the activation trigger engine 152 determines a confidence level that a given audio input includes an activation trigger. For instance, the activation trigger engine 152 returns a value between 0 and 100. A confidence value of 0 indicates no confidence that there is a match (e.g., indicating that there is no match between the audio input and a pattern of an activation trigger), and a confidence value of 100 indicates complete confidence that there is a match (e.g., there is a perfect match between the audio input and a pattern of an activation trigger). The obtained audio input can include utterances that are directed to the appliance 150, utterances directed to another target (e.g., another person nearby), ambient room noise, or other sounds. A variety of different techniques are usable to determine if the audio input includes an activation trigger.

In one example, features are extracted from the audio input and provided to a machine learning framework that determines a confidence level that the extracted features correspond to an activation trigger, such as the utterance-based framework 104 trained to detect activation triggers. Audio data, in general, and human speech data, in particular, contain large amounts of extractable data features. Focusing on features that are particularly helpful to the task at hand is advantageous, such as detection of an activation trigger. Various techniques are usable for feature extraction, such as mel-frequency cepstrum representation of audio data can be used to generate cepstral coefficients features for processing. In other examples, mel-frequency cepstral coefficients, log filter banks, cepstral analysis, or other techniques are used.

In another example, feature extraction is performable using invertible feature extraction (e.g., using Fourier transforms). For instance, instead of relying on features or parameters only from a time domain of a signal, the signal is transformed into a frequency domain using Fourier transformation. Parameters are then extracted from the frequency domain.

Once extracted, the extracted features are analyzed to determine a similarity with a pattern associated with an activation trigger. This analysis is performable using a variety of techniques including but not limited to hidden Markov models, neural networks, and other techniques. In many instances, the activation trigger engine 152 includes a pre-trained or pre-generated pattern to compare the features against.

At operation 313, if the received audio input matches the pattern, then the flow of the process 300 moves to operation 314. If the received audio input does not match the pattern, the flow of the process 300 moves back to operation 310.

The audio input is considered to match the pattern if a difference between the features of the audio input and the pattern satisfy a threshold.

The portion of the process 300 that includes operations 310, 312, and 313 can be referred to as monitoring the output of an audio input device for an activation trigger pattern. Once a match is detected, the flow moves to operation 314 and the monitoring continues.

At operation 314, the activation trigger engine 152 causes the speech analysis engine 154 to be activated. For instance, previously the speech analysis engine 154 was operating in an inactive state in operation 320. The inactive state is able to take a variety of different forms. In some instances, the speech analysis engine 154 includes a resource-intensive process for analyzing speech input and while the speech analysis engine 154 is operating in the inactive state, the process is not running. In another example, the speech analysis engine 154 performs analysis on data within a queue and halts when the queue is empty. In still other examples, the speech analysis engine 154 operates in an inactive state with respect to the activation trigger engine 152 but still performs operations for other activation trigger engines, such as when the speech analysis engine 154 is located at a remote server and handles processing for multiple different devices.

Returning to operation 314, the activation trigger engine 152 is able to activate the speech analysis engine 154 in a variety of ways. In an example, the activation trigger engine 152 sends a signal to the speech analysis engine 154, executes a command, accesses an application programming interface associated with the speech analysis engine 154, populates a queue with data, or pipes the output of a recording device or process to the speech analysis engine 154, among other techniques.

At operation 322, the speech analysis engine 154 enters an active state. This operation takes a variety of different forms depending on the implementation of speech analysis engine 154. In general however, entering the active state involves the speech analysis engine 154 analyzing input data or preparing to analyze input data, such as is described in operations 324, 326 and 328.

In operation 324, the speech analysis engine 154 obtains some or all of the audio input data received in operation 310. In an example, the activation trigger engine 152 buffers the audio input data obtained and, when the audio input data is determined to match an activation trigger pattern, the contents of the buffer are provided to the speech analysis engine 154 for analysis. In such instances, the audio input obtained in operation 324 includes the activation trigger portion (e.g., activation trigger portion 210 as in utterance 202 of FIG. 3) as well as other portions that the speech analysis engine processes (e.g., the command portion 220 and the parameter portion 230 as in utterance 202 of FIG. 3). Once the audio input data is provided to the speech analysis engine 154 or a threshold amount of time passes, the buffer is cleared.

In some instances, the activation trigger engine 152 provides or redirects audio obtained after detection of the activation trigger to the speech analysis engine 154. In such instances, the speech analysis engine 154 obtains audio input data for a portion of an utterance following the activation trigger portion but not the activation trigger portion itself. In some instances, the audio input is "raw" audio data. In other instances, the audio input includes features extracted from the audio data.

After receiving at least a portion of the audio input, the speech analysis engine 154 can perform operation 326, which involves processing the audio input data. Processing audio input can take a variety of different forms. In many examples, processing audio input involves performing speech-to-text transcription of the audio input. In other examples, processing audio input can involve determining an intent associated with the utterance. For instance, if the speech analysis engine 154 were processing the utterance 202 as audio input, the speech analysis engine 154 performs speech-to-text transcription on the utterance 202 to determine that the audio input data corresponds to the text "hey computer play my favorites". In other instances, the speech analysis engine 154 processes the utterance 202 to determine that intent behind the utterance is to cause playback from a context called "my favorites".

At operation 328, the speech analysis engine 154 provides output based on the processing in operation 326. As will be understood, the output is based on the type of processing performed. In some instances, the output or audio data is provided to another analysis or processing engine for further processing, such as text analysis, natural language processing, emotion detection, or other processing. In other instances, that additional processing is performed by the speech analysis engine 154 in operation 326, and the results of that additional processing is provided.

In some examples, the speech analysis engine 154 determines that the user's intent is to access personalized services on the appliance 150. For example, responsive to the utterance "ahoy computer log me in", the process 300 provides an output causing a login command to be executed.

In one example implementation, the synthetic samples are generated based on a vector space representation of natural samples. An example of such a vector space representation is provided in FIG. 4. A process for generating a vector space representation is provided in FIG. 5.

Vector Space Representations of Utterances

Figure 4:
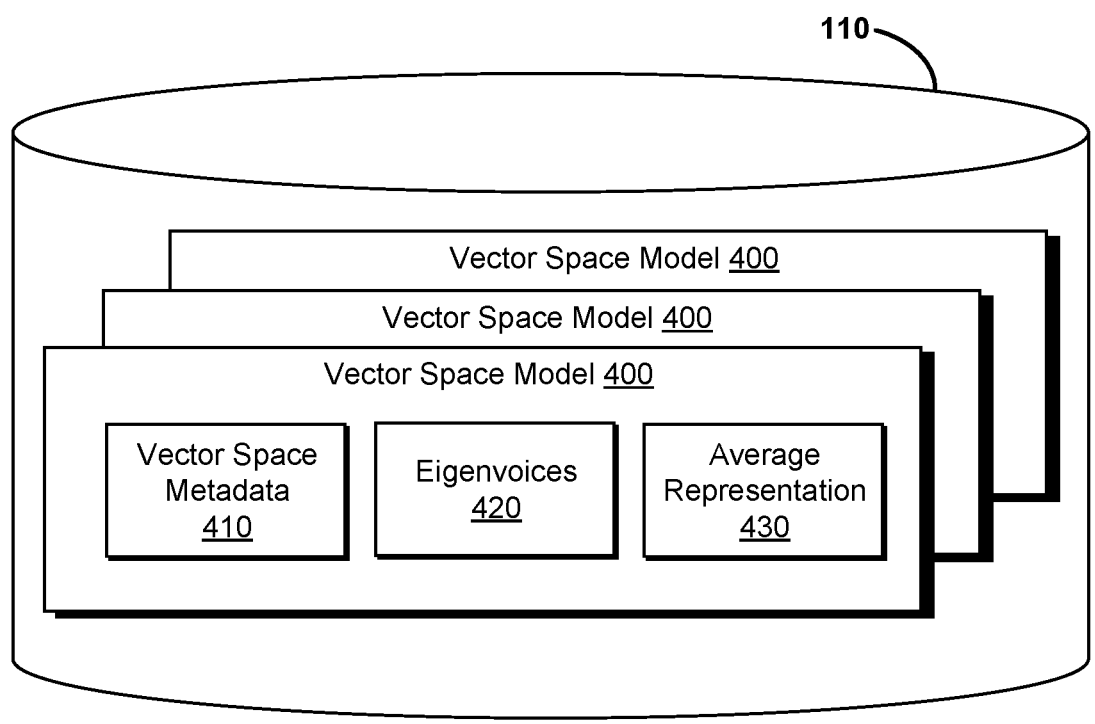
FIG. 4 illustrates an example vector space data store.

FIG. 4 illustrates an example vector space data store 110. The vector space data store 110 takes a variety of different forms depending on implementation. In the illustrated example, the vector space data store 110 contains one or more vector space models 400. Each vector space model 400 is a data structure or collection of data structures for storing data defining a vector space model. In the illustrated example, a vector space model 400 includes vector space metadata 410, eigenvoices 420, and an average representation 430. The vector space metadata 410 includes a variety of different kinds of data regarding the vector space model 400. In an example, the vector space metadata 410 includes information regarding how the vector space model was created, such as a number of training samples used to create the vector space model, a version number, a date created, and other kinds of data. In an example, the vector space metadata 410 stores the eigenvalues of all used samples. The eigenvalues can be used for a variety of purposes, including determining upper and lower thresholds of acceptable values of synthetic eigenvalues. In an example, the vector space metadata 410 includes an utterance associated with the vector space model 400, such as the utterance used during its creation. For instance, there can be a first vector space model created based on utterances of the phrase "ahoy computer" and a second vector space model created based on the utterances of the phrase "log me in".

In an example, the vector space model 400 further includes one or more eigenvoices 420 and an average representation 430. Eigenvoices and average representations are described in greater detail below, including in relation to FIG. 5.

Figure 5:
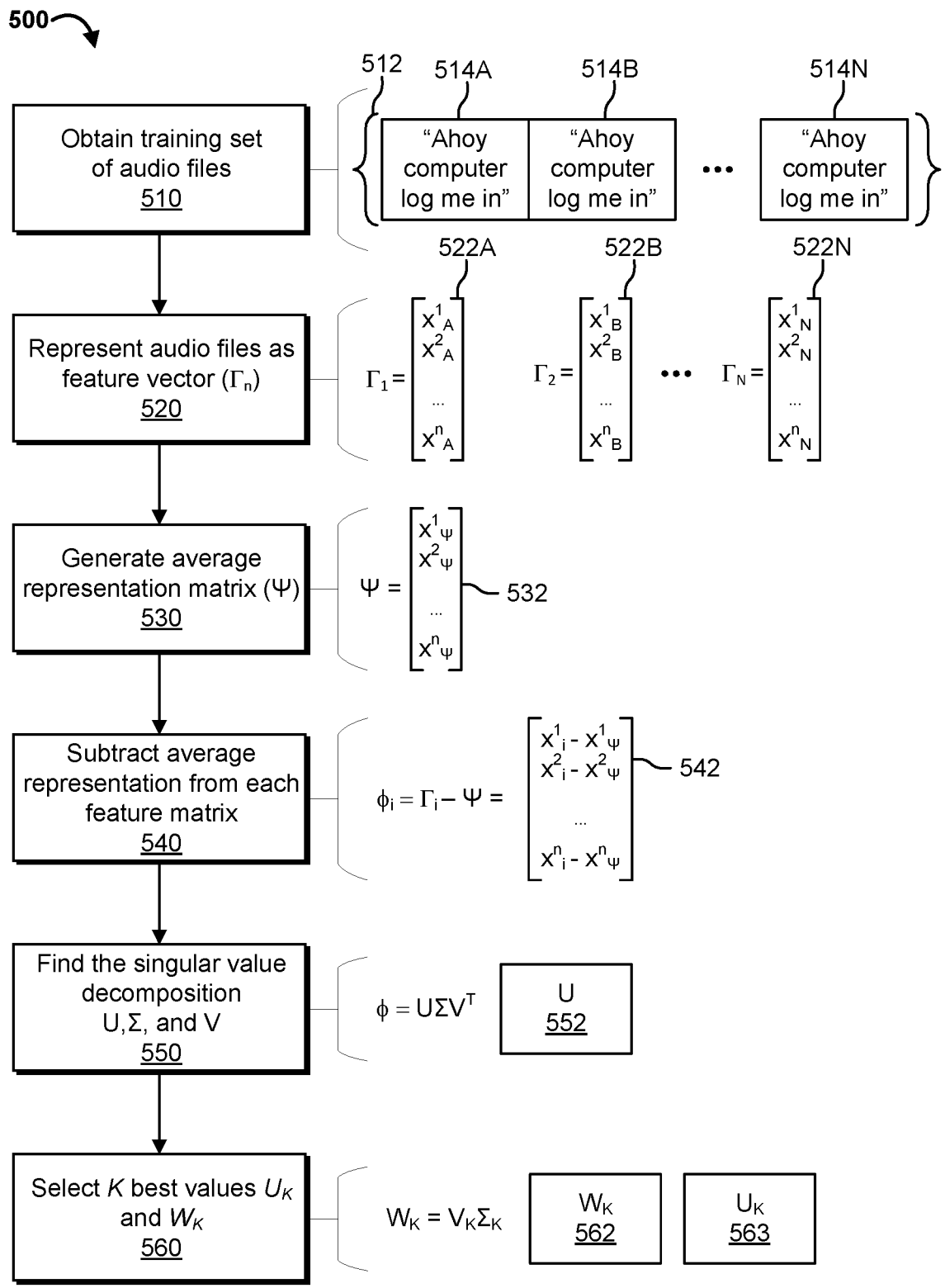
FIG. 5 illustrates an example process for creating a vector space model.

FIG. 5 illustrates an example process 500 for creating a vector space model (e.g., vector space model 400). In many examples, the process 500 is performed in whole or in part on the training device 100 or the appliance 150, though in some examples, the process 500 is performed elsewhere (e.g., carried out at a server such as server 1002 of FIG. 10), and the resulting vector space model is provided to the training device 100 or the appliance 150 for use. The process begins with operation 510.

At operation 510, a training set of audio clips 512 is obtained. In an example, obtaining the training set of audio clips 512 includes accessing one or more data structures or locations that store the audio clips or creating the audio clips from recordings, among other possibilities. The illustrated training set 512 includes multiple audio clips 514A, 514B, . . . , 514N (collectively audio clips 514) of utterances. The audio clips 514 can be obtained from multiple different sources in order to obtain a sufficiently large sample size to create a vector space representation. The use of multiple different audio sources representing a diverse background of voices facilitates the creation of a robust vector space.

In many examples, the audio clips 514 include audio of a same text being vocalized, (e.g., multiple different individuals saying the phrase "ahoy computer log me in"). In an example, the training set of audio clips 512 further includes multiple audio clips of recordings by the same source (e.g., the same user saying "ahoy computer log me in" multiple times).

In many examples, the samples are natural samples but synthetic samples are usable as well as or instead of the natural samples. For instance, the training set 512 can include audio clips 514 obtained from individuals speaking a phase. The training set 512 may be biased toward particular kinds of audio clips 514 by having, for instance, relatively more audio clips 514 of a first kind of voice (e.g., high-pitched) than a second kind of voice (e.g., low-pitched). Synthetic audio clips 514 are generated using one or more techniques described herein to augment the training set by generating additional audio clips 514 having the second kind of voice. The synthetic audio clips 514 are then added to the training set 512, thereby producing a more balanced training set 512 to facilitate the creation of a more robust vector space.

At operation 520, the audio clips 514 are each represented as a feature vector 522A, 522B, . . . , 522N (collectively feature vectors 522) to form a plurality of feature vectors 522. In some examples, the training set 512 is already represented as feature vectors rather than raw audio clips. In other examples, the feature vectors 522 are generated based on the training set 512 obtained in operation 510. The feature vectors 522 can be generated in a variety of ways, including but not limited to mel-frequency cepstrum representation of the audio clips 514 used to generate cepstral coefficients users features for processing. In other examples, mel-frequency cepstral coefficients, log filter banks, or other techniques are used. As illustrated, the feature vectors 522 each include n (designated by the superscript) feature value entries x.

At operation 530, an average representation vector 532 of the feature vectors 522 is generated from the plurality of feature vectors 522. In an example, the average representation vector 532 is generated by taking an average of the feature vectors 522. Other statistical analyses are usable to create the average representation vector 532, including statistical processes other than average.

At operation 540, the average representation vector 532 is subtracted from the plurality of feature vectors 522 (e.g., subtracting the average representation vector 532 from each of the feature vectors 522) to obtain a mean-centered result 542.

At operation 550, a singular value decomposition is performed based on the mean-centered result 542 of operation 540 to obtain all eigenvoices 552.

At operation 560, the K best eigenvoices 563 are selected from eigenvoices 552 and the K best eigenvalues 562 are also selected. The selecting of the K best eigenvoices 563, rather than using all of the eigenvoices 552, provides technical improvements by improving processing speed of future calculations and decreasing memory requirements by reducing the number of eigenvoices used to define a vector space. As K increases, resource demands increase along with the quality of the representation of voices within the vector space. In an example, the value K is selected to be sufficiently high to balance desired performance with desired quality, which varies on an application-by-application basis. The K best eigenvalues 562 are linear weights usable to reconstruct a voice or used in a matching process (e.g., to identify a voice input as being associated with a particular user).

As result of process 500, a vector space is created with which authentication or other processes can be performed. For instance, with reference to FIG. 4, values for the vector space metadata 410, the eigenvoices 420, and the average representation 430 of the vector space model 400 can be known following the process 500. These values can be saved in memory, such as in the vector space data store 110.

The vector space data store 110, the eigenvoices 563, and the eigenvalues 562 are usable to facilitate the creation of synthetic voice samples and provide improvements to systems and processes for training or testing utterance based frameworks.

Training and Testing

Figure 6:
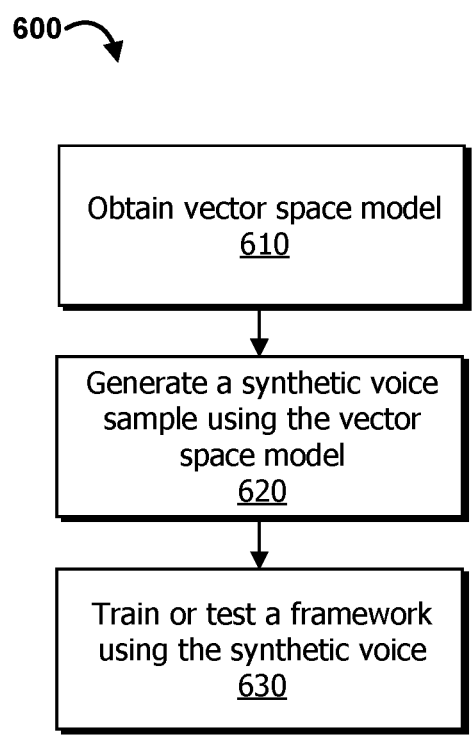
FIG. 6 illustrates an example method for training or testing utterance-based frameworks using a vector space model and the device.

FIG. 6 illustrates an example process 600 for training or testing utterance-based frameworks using a vector space model and the device 100. The process 600 begins with operation 610, which involves obtaining a vector space model. In an example, the training and testing engine 102 accesses a vector space data structure stored locally or remotely from the device 100 (e.g., in the vector space data store 110). In some examples, the vector space model is provided to the device 100 by a user for testing or training the vector space model. In other examples, the training and testing engine 102 generates the vector space model or portions thereof (see, e.g., FIG. 5 and associated disclosure).

At operation 620, one or more synthetic voice samples are generated using the vector space model. A synthetic voice sample is able to be generated in a variety of different ways. In one example, artificial entries are created within or with respect to the obtained vector space model, such as by generating random or pseudorandom entries within or with respect to the vector space. For instance, a feature vector is generated having one or more values that, as opposed to being representative of a natural voice sample obtained from a real person (e.g., see operation 520 of FIG. 5), are artificially generated using one or more random or pseudo-random values.

In some instances, the synthetic voice sample is generated based, at least in part, on one or more natural voice samples. In an example, a synthetic voice sample is generated based on statistical analyses of two or more natural voice samples, such as performing statistical analysis on natural entries within the vector space to determine an average, median, mode, standard deviation, maximum value, minimum value, or other parameters. One or more of these parameters are usable as part of the generation of one or more synthetic feature vectors. For instance, a plurality of feature vectors are generated based on random or pseudorandom values that fall between a maximum value and a minimum value of natural feature vector values within the vector space.

In another example, the synthetic voice sample is generated using a genetic algorithm. For instance, the one or more natural voice samples are used as part of an initial population. Selection, crossover, and mutation are applied to the initial population. The results are checked for convergence on a solution and analysis is performed. Examples of crossover include one-point crossover at 50%, one-point crossover at a random point, two-point crossover at a random position, three-parent crossover, and uniform crossover, among others. Examples of mutation include flip bit mutation, boundary mutation, non-uniform mutation, flip bit variant; and boundary variant, among others. In some instances, the fitness function of the genetic algorithm is based on the distance of the synthetic sample from a particular natural sample, with the genetic process stopping before convergence occurs to preserve variation in the generated synthetic samples. In other instances, the fitness function is based on the existence of the synthetic sample within the bounds of possible natural samples (e.g., within upper and lower bounds). In still other instances, the confidence level of an activation trigger engine (e.g., activation trigger engine 152) that the synthetic sample contains or matches an activation trigger is used as the fitness function. For example, samples that cause a high confidence level output from an activation trigger engine are fitter than samples that cause a low confidence level output from the activation trigger engine. In another example, it may be advantageous to produce samples that cause a low confidence level output (e.g., to generate negative training samples or to generate training samples to overcome deficiencies in an activation trigger engine). In such examples, samples that cause a low confidence level output from an activation trigger engine are fitter than samples that cause a high confidence level output from the activation trigger engine. In further instances, genetic operations are applied to the one or more natural samples to generate synthetic samples and increase diversity without regard to a particular fitness function.

In an example, a genetic algorithm is used to improve the quality of a synthetic sample. For instance, there is a synthetic sample generated to match an activation trigger that nonetheless causes an output indicating a low confidence level when provided as input to an activation trigger engine. A weight vector or synthetic sample causing such an output can be referred to as a low-confidence weight vector. The synthetic sample is then modified using a genetic algorithm. For instance, the synthetic sample or weight vector is mutated based on natural or synthetic samples or weight vectors that produced a high confidence level output from the activation trigger engine. For instance, the operation 620 can include: obtaining a low-confidence natural weight vector; obtaining a high-confidence weight vector; and applying a genetic algorithm to the low-confidence natural weight vector and the high-confidence weight vector, thereby generating a synthetic weight vector.

In this manner, the mutation results in one or more new synthetic samples that are improved relative to the original synthetic sample (e.g. the resulting "offspring" samples have improved "genes" compared to at least one of the parent samples).

In another example, a genetic algorithm is used to generate synthetic samples based on low-performing natural samples for training or testing. For instance, there is a set of natural training samples that cause an activation trigger engine to produce an incorrect output (e.g., produce a high confidence level output when a low confidence level output should have resulted or vice versa). Synthetic training samples are then generated by applying genetic algorithms to the set of natural training samples. The synthetic training samples are then used to train or test the activation trigger engine.

For training purposes, the synthetic voice sample can represent a positive or negative result. For example, when testing or training an activation trigger framework designed to respond to the trigger "ahoy computer", many synthetic voice samples are generated that represent an utterance containing the trigger "ahoy computer". Synthetic voice samples can also be generated that represent an utterance that does not contain the trigger. In some examples, such synthetic voice samples include sound-alike utterances in order to facilitate training. The synthetic voice samples are associated with metadata that defines an expected result or other aspect of the sample to facilitate training. In an example, a synthetic voice sample for training or testing the activation trigger "ahoy computer" has metadata describing expected results (e.g., whether or not the activation trigger framework, if it were behaving as intended, should respond as having detected or not detected the trigger).

At operation 630, one or more frameworks are trained or tested using the one or more synthetic voice samples generated in operation 620. In many examples, the frameworks are used in conjunction with voice input data, such as activation trigger detection frameworks and speech-to-text frameworks, among others. The one or more frameworks are trainable and testable in a variety of different ways based on how the framework is designed. In one example, a feature vector representation of the synthetic voice sample is provided as input to the framework and an output is observed. For example, where the framework is activation trigger detection framework, a feature vector representation of a synthetic voice uttering the activation trigger is provided as input. The expected result would therefore be that the activation trigger framework indicates that an activation trigger is detected. During training, such expected result is used to shape or otherwise train the framework (e.g., adjust weights within a neural network). During testing, such expected results are compared to an actual result of the framework and used to determine a fitness of the framework for a purpose. In an example, the operation 630 includes receiving an output from the utterance-based framework 104 (e.g., regarding whether a synthetic voice sample included an activation trigger).

In some examples, the synthetic feature vectors are used themselves as the synthetic voice samples for the purposes of training or testing a machine learning framework. In other examples, the synthetic feature vectors are used to generate synthetic audio samples, with the synthetic audio samples being used for training or testing a framework. In an example, one or more parameters of a speech synthesizer are calculated based on the synthetic feature vector (e.g., timber, cadence, or pitch parameters, among others). In other examples, some or all of the feature vector itself is provided as input to the speech synthesizer or associated component. The synthetic audio samples are stored or encoded as audio files.

In other examples, an audio representation of the synthetic voice sample is provided as input to the framework or a device or system working in conjunction with the framework. For instance, in the example illustrated in FIG. 1, the device 100 is testing the appliance 150 by producing with the speaker 12, a synthetic utterance 14 to the appliance 150. The appliance 150 receives the synthetic utterance 14 audio at a microphone or other component, and a response of the appliance 150 is then observed (e.g., whether the appliance 150 behaves as though it detected an activation trigger within the synthetic utterance 14). In other examples, the synthetic utterance 14 need not be played by the speaker 12. For instance, an audio file encoding the synthetic utterance 14 or a feature vector representative of the synthetic utterance 14 is provided as input for testing purposes.

The training or testing of the utterance-based framework 104 need not be limited to only the use of synthetic utterances 14. The process 600 can be used to supplement natural voice samples obtained from a test group. In an example, natural samples obtained from the test group are used to generate the synthetic samples, and both the synthetic samples and natural samples are provided as part of a combined set for training or testing the framework. In another example, the synthetic samples are provided only for testing and the natural samples are provided only for training, or vice versa.

In addition, the process 600 is repeatable for an iterative approach to training and testing an utterance-based framework 104. In an example, an utterance-based framework 104 is trained and tested a first time using natural samples and synthetic samples. Then, based on performance of the utterance-based framework 104 during testing, synthetic samples are generated and added to the test set so the framework is able to be trained again. For instance, testing may uncover that the utterance-based framework 104 has difficulty with particular types of samples (e.g., the output of the framework has decreased accuracy in voices having a particular accent). Additional synthetic training samples are then generated based on the natural or synthetic samples with which the framework had difficulty (e.g., the samples that, when provided as input to the framework, caused the framework to provide an incorrect result). For example, the training and testing engine 102 selects a training sample that the framework incorrectly processed during testing and generates one or more synthetic samples based on that sample.

The training and testing engine 102 generates one or more synthetic feature vectors based on a feature vector that the framework processed incorrectly. For example, the one or more synthetic feature vectors are generated by adjusting the values of one or more natural feature vectors associated with incorrect output. In this manner, the resulting one or more synthetic features vector are different from (yet nonetheless similar to) the feature vectors of the samples that were processed incorrectly. In an example, the one or more synthetic feature vectors are created by multiplying one or more of the values of the incorrectly-processed feature vector by a random or pseudorandom number in a range (e.g., 0.9 to 1.1). In another example, the one or more synthetic feature vectors are created by applying a genetic algorithm to the one or more incorrectly-processed feature vectors. For instance, the incorrectly-processed feature vectors are crossed-over with (e.g., mutated based on) one or more correctly-processed feature vectors to produce offspring synthetic feature vectors. The one or more synthetic feature vectors created from the incorrectly-processed feature vectors are then used to update the utterance-based framework 104.

The process of training, testing, and generating new training samples can be repeated until the utterance-based framework 104 is sufficiently robust (e.g., the accuracy of the utterance-based framework 104 satisfies a threshold). In this manner, additional training samples are generated in response to difficulties encountered during testing without needing to obtain additional natural samples to overcome difficulties. This iteration is relevant to improvements to a computer's ability to train a framework by improving training time and accuracy with lower natural sample requirements.

Figure 7:
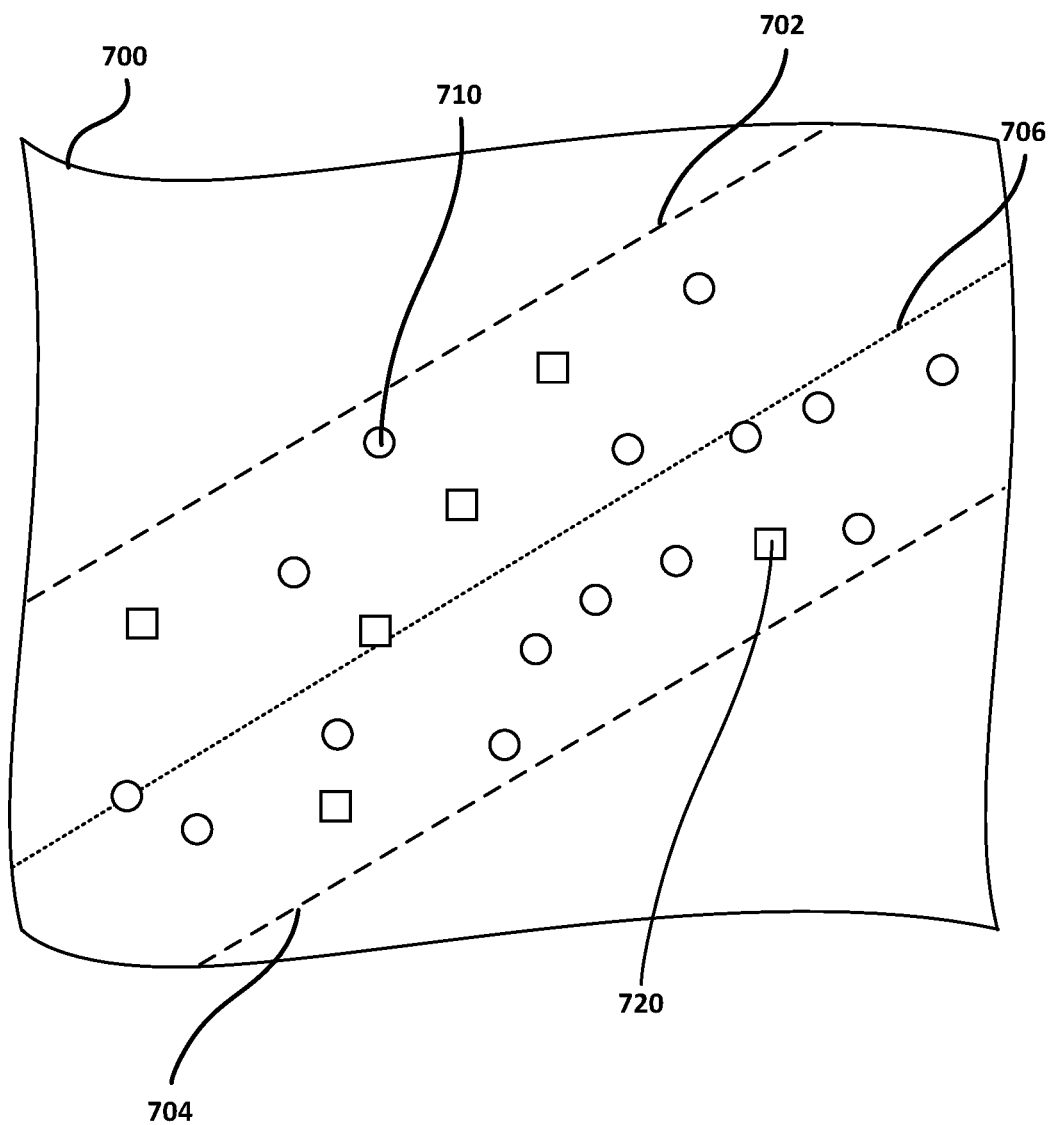
FIG. 7 illustrates an example representation of a vector space in which both natural samples and synthetic sample are shown in relation to a principal component analysis value within the eigenspace and in relation to an upper threshold and a lower threshold.

FIG. 7 illustrates an example visual representation of a vector space 700 in which natural samples 710 and synthetic sample 720 are shown in relation to a principal component analysis value 706 within the vector space 700 and in relation to an upper threshold 702 and a lower threshold 704. The upper threshold 702 in the lower threshold 704 represent bounds on potential generation of synthetic examples 720. The upper threshold 702 and lower threshold 704 are generated based on or in relation to the natural samples 710 or the principal component analysis 708. The principal component analysis value 706 is generated during the creation of the vector space 700. Natural samples 710 and synthetic sample 720 need not necessarily be plotted as entries in or associated with a vector space. In some instances, the natural samples 710 and synthetic samples 720 are defined based on the vector space 700 (e.g., defined based on eigenvalues and an average representation of the vector space 700). An example process for generating and using synthetic samples 720 is described in relation to FIG. 8.

Figure 8:
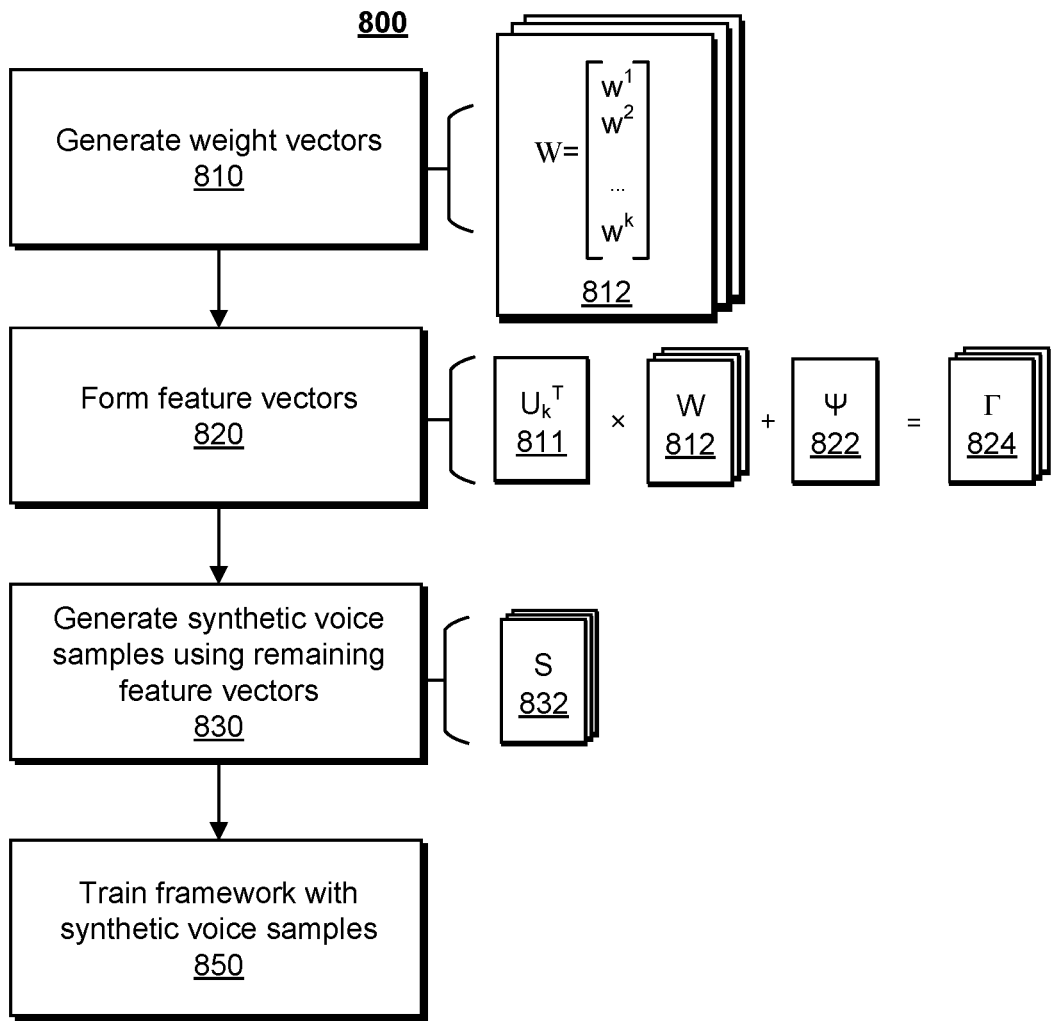
FIG. 8 illustrates an example process for training a framework with synthetic voice samples.

FIG. 8 illustrates an example process 800 for training a framework with synthetic voice samples. The process 800 begins with operation 810, which involves generating synthetic weight vectors 812 associated with a vector space. In an example, this operation 810 involves calculating or generating K values for weights of the synthetic weight vectors 812.

The operation 810 involves obtaining one or more natural weight vectors associated with a natural voice sample and modifying one or more of the weights of the natural voice sample to create the one or more synthetic weight vectors 812. For example, the one or more values of the natural weights are adjustable based on a tolerance (e.g., each weight may be multiplied by a pseudorandom value within a tolerance range, such as 0.8 and 1.2).

The operation 810 involves obtaining two or more natural weight vectors associated with two or more natural voice samples. The synthetic weight vectors 812 are able to be generated in relation to the two or more natural weight vectors. In an example, the synthetic weight vectors 812 are generated by averaging the two or more weight vectors or generated in relation to the average. In yet another example, the synthetic weight vectors 812 is generated based on pseudorandom values. For instance, one or more values in the synthetic weight vectors 812 are random or pseudorandom values or based thereon and are between a lower threshold 704 and the upper threshold 702. In another example, the synthetic weight vectors 812 are generated using a genetic algorithm using one or more of the techniques previously described herein.

In still other examples, the operation 810 involves generating the synthetic weight vectors 812 based on one or more desired weights. For instance, testing can uncover that a particular utterance-based framework (e.g., an activation trigger engine) has decreased accuracy for inputs having particular characteristics (e.g., utterances from individuals with deep voices). The synthetic weight vectors 812 are then generated based on the utterances that the framework processed with reduced accuracy (e.g., so as to represent a voice sample having the desired deep voice characteristics). Such samples are then used to provide additional training and testing samples to make the framework more robust.

In an example, operation 810 includes obtaining one or more natural weight vectors; and applying a genetic algorithm to the one or more natural weight vectors, thereby generating the synthetic weight vector 812. In some examples, applying the genetic algorithm to the one or more natural weight vectors includes applying crossover to two natural weight vectors, thereby generating the synthetic weight vector 812. In some examples, generating the synthetic weight vector 812 includes: obtaining a low-confidence natural weight vector; obtaining a high-confidence weight vector; and applying a genetic algorithm to the low-confidence natural weight vector and the high-confidence weight vector, thereby generating the synthetic weight vector 812. In an example, the operation 810 includes generating the synthetic weight vector 812 comprises generating the synthetic weight vector 812 based on a training sample that the utterance-based framework 104 processed incorrectly.

At operation 820, one or more synthetic feature vectors 824 are formed. In an example, eigenvoices 811 are multiplied with the one or more synthetic weight vectors 812, and the resulting product is added to an average representation 822 to form one or more synthetic feature vectors 824. In an example, the eigenvoices 811 and the average representation 822 is associated with a particular vector space (e.g., average representation 430 vector space model 400 of FIG. 4). In an example, the operation 820 includes adding an average representation 822 of the vector space to a product of multiplying the synthetic weight vector 812 and eigenvoices 811 associated with the vector space, thereby forming a synthetic feature vector 824.

In some examples, synthetic feature vectors 824 that are outliers, if any, are remediated. Remediation is able to be performed in a variety of ways, such as removing or correcting the outliers. In many examples, operation 810 involves generating the weight vectors 812 in a manner that outliers are avoided (e.g., by selecting values for the weight vectors 812 within boundaries of natural-sounding speech). But in some examples, operations 810 and 820 can result in synthetic weight vectors 812 or synthetic feature vectors 824 with values that are outliers. Outliers are values that are outside a normal or useful range, such as sample that is not representative of a sample receivable from a human source.

Outliers are detectable in a variety of ways. In an example, an outlier is a synthetic weight vector 812 or a synthetic feature vector 824 having one or more values outside of a range expected from natural samples and therefore is not useful for training or testing a framework designed to process human utterances. An outlier is detectable by comparing each value of a synthetic weight vector 812 or synthetic feature vector 824 against an upper or lower threshold (e.g., upper threshold 702 and lower threshold 704 of vector space 700 of FIG. 7). In another example, an outlier is detectable by comparing a distance of the synthetic sample (e.g., the synthetic weight vector 812 or synthetic feature vector 824 of a synthetic sample) to distances of natural samples within a vector space. If the distance is sufficiently great, the sample is considered an outlier.

In yet another example, an outlier is detected by synthesizing speech based on a synthetic feature vector 824, playing the synthesized speech for a person, and asking the person whether the synthesized speech sounds natural. If the synthesized speech sounds unnatural, then the synthetic weight vector 812 and the synthetic feature vector 824 associated with the synthesized is considered an outlier.

Outliers are detectable using a machine learning framework (e.g., a neural network) trained to detect synthetic speech. In an example, an adversarial machine learning process is created in which one or more machine learning frameworks are trained to create natural-sounding synthetic speech and one or more other frameworks are trained to detect synthetic speech. This process provides efficient creation of synthetic speech by identifying outliers as well as training a process to reduce the occurrence of outliers, thereby improving the efficiency of creating robust synthetic samples.

At operation 830, one or more synthetic voice samples 832 are generated using the synthetic feature vectors 824. Depending on the framework to be trained and the training or testing procedure, generating the synthetic voice samples 832 takes a variety of forms. In one example, the synthetic feature vectors 824 are provided as input to a speech synthesizer to create audio files. In other examples, the synthetic feature vectors 824 themselves are treated as the synthetic voice samples 832 or are converted into another format for use.

At operation 850, a framework is trained based on the one or more synthetic voice samples 832 generated in operation 830. In an example, the operation 850 includes providing the synthetic voice sample 832 to the utterance-based framework 104 as at least one of a testing or training sample. The operation 850 involves one or more techniques similar to those described in relation to operation 630 of FIG. 6. In an example, the operation 850 includes providing the synthetic voice sample 832 to an activation trigger detection framework, where the synthetic voice sample 832 includes a representation of a synthetic voice uttering an activation trigger. In an example, the operation 850 includes providing the synthetic voice sample 832 to an activation trigger detection framework, wherein the synthetic voice sample 832 includes a representation of a synthetic voice uttering an activation trigger. In an example, the operation 850 includes determining a fitness of the activation trigger detection framework based on comparing an expected output of the activation trigger detection framework and an actual output of the activation trigger detection framework responsive to the synthetic voice sample 832 being provided to the activation trigger detection framework. In an example, the operation 850 includes providing a natural sample 710 to the utterance-based framework 104 as at least one of a testing or training sample.

Figure 9:
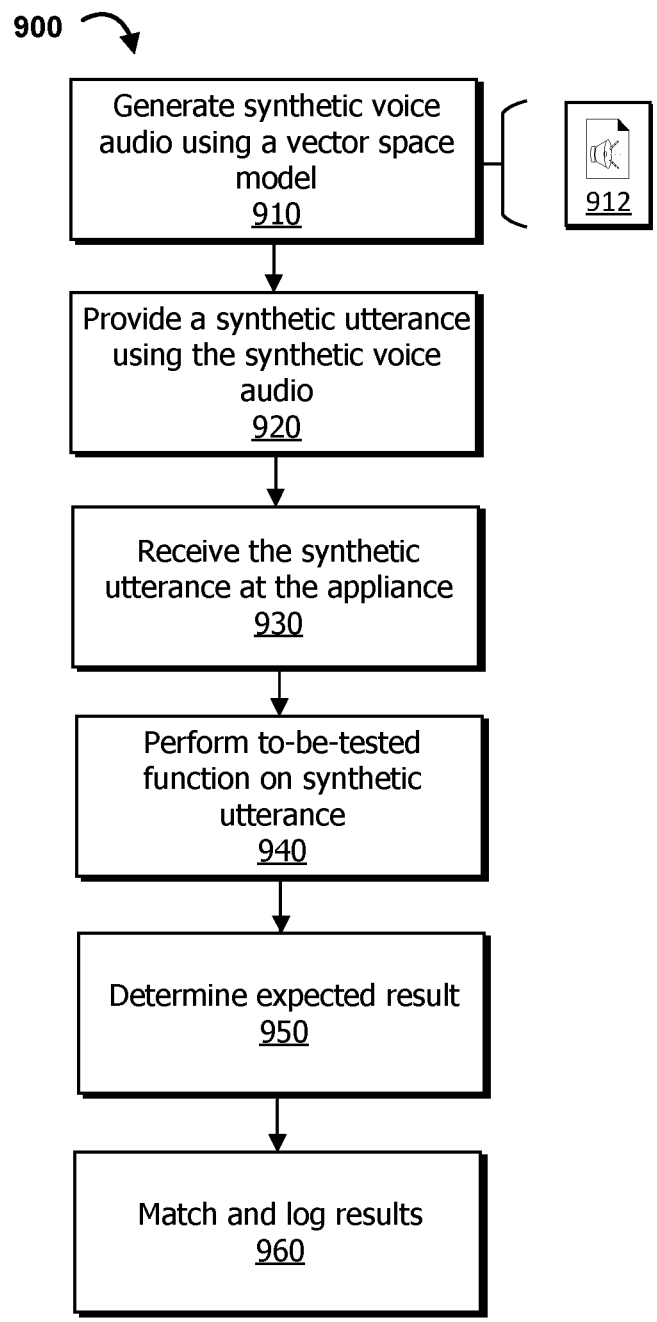
FIG. 9 illustrates an example process for testing an aspect of a voice-based framework using a synthetic voice.

FIG. 9 illustrates an example process 900 for testing a voice-based framework using a synthetic voice. This process 900 is described in relation to the system 10 shown and described in relation to FIG. 1, though the process 900 is applicable elsewhere. The process 900 begins with operation 910, which involves the training device 100 using the speech synthesizer 106 to generate a synthetic voice audio sample 912. In an example, the training device 100 provides a feature vector generated using one or more techniques described herein (e.g., as described in relation to FIG. 8) as input to the speech synthesizer 106. The feature vector is generated based on one or more vector spaces described in the vector space data store 110. One or more audio processing techniques are applicable to the synthetic voice audio sample 912. For example, noise, echo, or reverberation may be added or mixed with the synthetic voice audio sample 912 (e.g., to add diversity or robustness to the synthetic voice audio sample 912).

At operation 920, the device 100 provides a synthetic utterance 14 using the synthetic voice audio. In the illustrated example, this operation 920 takes the form of the device 100 using the speaker 12 to play the synthetic voice audio sample 912. As result, a synthetic utterance 14 is produced.

At operation 930, the synthetic utterance 14 is received at the appliance 150. For example, the appliance 150 includes one or more microphones that detect ambient noise. The one or more microphones receive the synthetic utterance 14.

At operation 940, the appliance 150 performs the to-be-tested function on the synthetic utterance 14. In an example, the to-be-tested aspect of the appliance 150 is activation trigger detection. An example of such a process is shown and described in relation to FIG. 3. In another example, the to-be-tested function of the appliance 150 is an authentication process, a user-identification process, or an emotion detection process, among others.

At operation 950, an expected result is determined. In some examples, the expected result is determined based on metadata associated with the generated synthetic voice audio sample 912. For example, during the generation process, the synthetic voice audio sample 912 is tagged with an expected result or a description of the contents of the synthetic voice audio sample 912. In another example, there is a manual or automatic speech-to-text transcription service that analyzes the synthetic utterance 14. The output of the transcription is analyzed to determine whether the synthetic utterance 14 contains a particular word or phrase. For instance, where the function being tested is an activation trigger framework, determining the expected result involves determining whether the synthetic utterance 14 includes an activation trigger. In some examples, this operation 950 is performed by the training device 100. In other examples, the operation 950 is performed by the appliance 150 or yet a different device (e.g., a remote server).

In some examples, the appliance 150 operates in a training, testing, or debugging mode or otherwise performs the to-be-tested aspect on the synthetic utterance and also performs another process on the utterance to determine the expected results. For example, continuing the activation trigger example, the appliance 150 both analyzes the received utterance using the activation trigger process (e.g., as described in FIG. 3) and provides the synthetic utterance 14 to a speech analysis engine 154 for more robust analysis to determine the expected result.

At operation 960, the result of the to-be-tested function is compared to the expected result. The result of the comparison is logged for review or additional training or testing. For example, if the actual result is different from the expected result, then the synthetic voice audio sample 912 that caused the errant result is flagged. Further training or testing based on the errant sample can be performed. For example, synthetic training examples are generated using the sample 912.

Device Environment

Figure 10:
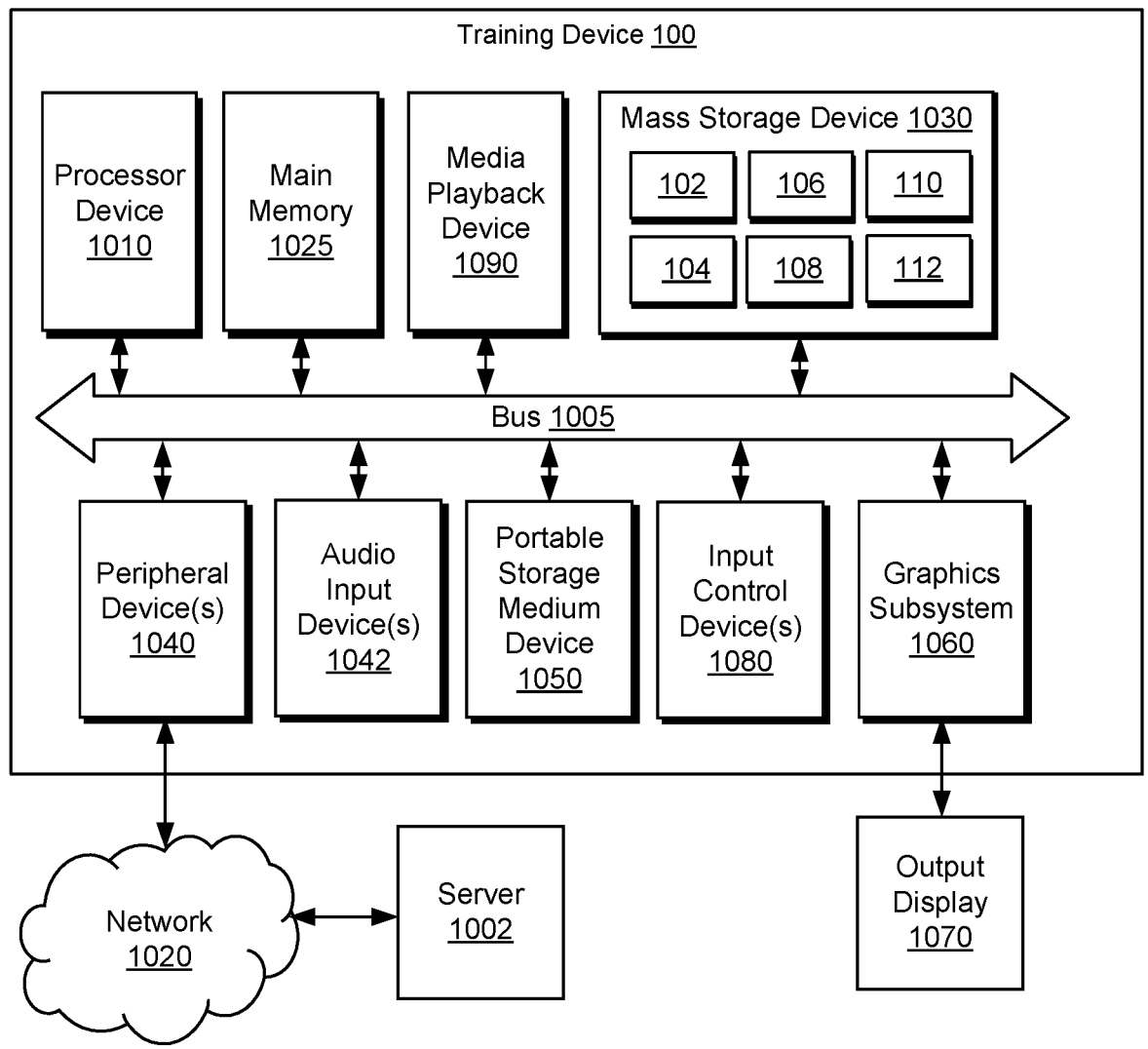
FIG. 10 is a block diagram showing an exemplary training device or appliance constructed to realize one or more aspects of the example embodiments described herein.

FIG. 10 is a block diagram showing an exemplary training device 100 or appliance 150 constructed to realize one or more aspects of the example embodiments described herein.

As discussed above, the appliance 150 includes a processor device 1010. Also included are a main memory 1025 and an interconnect bus 1005. The processor device 1010 may include without limitation a single microprocessor, or may include a plurality of microprocessors for performing one or more of the processes described herein. The main memory 1025 stores, among other things, instructions and/or data for execution by the processor device 1010. The main memory 1025 may include banks of dynamic random access memory (DRAM), as well as cache memory.

The appliance 150 may further include a mass storage device 1030, peripheral device(s) 1040, audio input device(s) 1042, portable non-transitory storage medium device(s) 1050, input control device(s) 1080, a graphics subsystem 1060, and/or an output display interface 1070. For explanatory purposes, all components in the appliance 150 are shown in FIG. 10 as being coupled via the bus 1005. However, the appliance 150 is not so limited. Elements of the appliance 150 may be coupled via one or more data transport means. For example, the processor device 1010, and/or the main memory 1025 may be coupled via a local microprocessor bus. The mass storage device 1030, peripheral device(s) 1040, portable storage medium device(s) 1050, and/or graphics subsystem 1060 may be coupled via one or more input/output (I/O) buses. The mass storage device 1030 may be a nonvolatile storage device for storing data and/or instructions for use by the processor device 1010. The mass storage device 1030 may be implemented, for example, with a magnetic disk drive or an optical disk drive. In a software embodiment, the mass storage device 1030 is for loading contents of the mass storage device 1030 into the main memory 1025. Memory may be embodied as one or more of mass storage device 1030, main memory 1025, or portable storage medium device 1050.

Mass storage device 1030 may additionally store one or more of the data structures or function as one or more of the data stores described above. Mass storage device 1030 may also include software that, when executed, causes the device 100 to perform the features described above. In the illustrated example, the mass storage device 1030 includes the training and testing engine 102, the utterance-based framework 104, the speech synthesizer 106, the synthetic samples store 108, the vector space data store 110, the natural samples, the activation trigger engine 152, the speech analysis engine 154. In other examples, the mass storage device stores components of the appliance 150, such as the activation trigger engine 152, the speech analysis engine 154, and the utterance-based framework 104.

The portable storage medium device 1050 operates in conjunction with a nonvolatile portable storage medium, such as, for example, a solid state drive (SSD), to input and output data and code to and from the appliance 150. In some embodiments, the software for storing information may be stored on a portable storage medium, and may be inputted into the appliance 150 via the portable storage medium device 1050. The peripheral device(s) 1040 may include any type of computer support device, such as, for example, an input/output (I/O) interface configured to add additional functionality to the appliance 150. For example, the peripheral device(s) 1040 may include a network interface card for interfacing the appliance 150 with a network 1020. The audio input devices 1042 may be one or more devices configured to receive or obtain audio and provide a representation of the audio (e.g., as an audio clip or file) as output. The audio input device(s) 1042 may include one or more microphones or other devices.

The input control device(s) 1080 provide a portion of an interface for the appliance 150. The input control device(s) 1080 may include a keypad and/or a cursor control device. The keypad may be configured for inputting alphanumeric characters and/or other key information. The cursor control device may include, for example, a handheld controller or mouse, a rotary input mechanism, a trackball, a stylus, and/or cursor direction keys. In order to display textual and graphical information, the appliance 150 may include the graphics subsystem 1060 and the output display 1070. The output display 1070 may include a display such as a TFT (Thin Film Transistor), TFD (Thin Film Diode), OLED (Organic Light-Emitting Diode), AMOLED display (active-vector organic light-emitting diode), and/or liquid crystal display (LCD)-type displays. The displays can also be touchscreen displays, such as capacitive and resistive-type touchscreen displays.

The graphics subsystem 1060 receives textual and graphical information, and processes the information for output to the output display 1070.

Input control devices 1080 can control the operation and various functions of appliance 150. Input control devices 1080 can include any components, circuitry, or logic operative to drive the functionality of appliance 150. For example, input control device(s) 1080 can include one or more processors acting under the control of an application.

Each component of the appliance 150 may represent a broad category of a computer component of a general and/or special purpose computer. Components of the appliance 150 are not limited to the specific implementations provided herein.

Software embodiments of the examples presented herein may be provided as a computer program product, or software, that may include an article of manufacture on a machine-accessible or machine-readable medium having instructions. The instructions on the non-transitory machine-accessible, machine-readable or computer-readable medium may be used to program a computer system or other electronic device. The machine- or computer-readable medium may include, but is not limited to, magnetic disks, optical disks, magneto-optical disks, or other types of media/machine-readable medium suitable for storing or transmitting electronic instructions. The techniques described herein are not limited to any particular software configuration. They may find applicability in any computing or processing environment. The terms "computer-readable", "machine-accessible medium" or "machine-readable medium" used herein shall include any medium that is capable of storing, encoding, or transmitting a sequence of instructions for execution by the machine and that causes the machine to perform any one of the methods described herein. Further, it is common in the art to speak of software, in one form or another (e.g., program, procedure, process, application, module, unit, logic, and so on), as taking an action or causing a result. Such expressions are merely a shorthand way of stating that the execution of the software by a processing system causes the processor to perform an action to produce a result.

Some embodiments may also be implemented by the preparation of application-specific integrated circuits, field-programmable gate arrays, or by interconnecting an appropriate network of conventional component circuits.

Some embodiments include a computer program product. The computer program product may be a storage medium or media having instructions stored thereon or therein which can be used to control, or cause, a computer to perform any of the procedures of the example embodiments of the invention. The storage medium may include without limitation an optical disc, a ROM, a RAM, an EPROM, an EEPROM, a DRAM, a VRAM, a flash memory, a flash card, a magnetic card, an optical card, nanosystems, a molecular memory integrated circuit, a RAID, remote data storage/archive/warehousing, and/or any other type of device suitable for storing instructions and/or data.

Stored on any one of the computer-readable medium or media, some implementations include software for controlling both the hardware of the system and for enabling the system or microprocessor to interact with a human user or other mechanism utilizing the results of the example embodiments of the invention. Such software may include without limitation device drivers, operating systems, and user applications. Ultimately, such computer-readable media further include software for performing example aspects of the invention, as described above.

Included in the programming and/or software of the system are software modules for implementing the procedures described above.

The appliance 150 may be connected over the network 1020 to one or more servers 1002 or other remote devices. The one or more servers 1002 can include one or more components described above in relation to appliance 150, including a mass storage device and a processor device. Various operations and processes described herein can be performed by the cooperation of two or more devices, systems, processes, or combinations thereof.

There can be a number of drawbacks in training a machine learning framework to detect an activation trigger. For example, it is often necessary to obtain a diverse number of voice samples from a diverse number of individuals. Diversity can allow for a robust enough sample space to have a well-functioning detection framework. Challenges can arise in obtaining a sufficient number of samples to create a robust, activation trigger detection framework for a large number of different possible activation triggers. So a smaller number of possible activation triggers may be selected and associated frameworks may be trained. This can limit a user's enjoyment of the device by providing a reduced ability for a user to customize the device. In various aspects disclosed herein, there are systems and methods for producing synthetic samples, which decrease the number of natural samples needed in order to robustly train a framework. Synthetic samples can be used to generate an improved framework from a smaller number of natural samples.

While various example embodiments of the present invention have been described above, it should be understood that they have been presented by way of example, and not limitation. It will be apparent to persons skilled in the relevant art(s) that various changes in form and detail can be made therein. Thus, the present invention should not be limited by any of the above described example embodiments, but should be defined only in accordance with the following claims and their equivalents. Further, the Abstract is not intended to be limiting as to the scope of the example embodiments presented herein in any way. It is also to be understood that the procedures recited in the claims need not be performed in the order presented.

The invention claimed is:

1. A method for training an utterance-based framework, the method comprising:
   generating a synthetic weight vector associated with a vector space, wherein generating the synthetic weight vector includes:
      obtaining a weight vector associated with a training sample that the utterance-based framework processed incorrectly; and
      applying a genetic algorithm to the obtained weight vector associated with a training sample that the utterance-based framework processed incorrectly, wherein the applying includes:
         mutating the obtained weight vector associated with a training sample that the utterance-based framework processed incorrectly based on a weight vector associated with a training sample that the utterance-based framework processed correctly;
      adding an average representation of the vector space to a product of multiplying the synthetic weight vector and eigenvoices associated with the vector space, thereby forming a synthetic feature vector;

generating a synthetic voice sample based on the synthetic feature vector, wherein generating the synthetic voice sample based on the synthetic feature vector includes providing the synthetic feature vector as input to a speech synthesizer; and training the utterance-based framework, wherein the training includes providing the synthetic voice sample to the utterance-based framework as a training audio sample.

2. The method of claim 1, wherein applying the genetic algorithm includes:

applying crossover to: (1) the obtained weight vector associated with the training sample that the utterance-based framework processed incorrectly and (2) one or more weight vectors that the utterance-based framework processed correctly, thereby generating the synthetic weight vector.

3. The method of claim 1, wherein obtaining the one or more natural weight vectors includes obtaining a low-confidence natural weight vector;

wherein generating the synthetic weight vector includes obtaining a high-confidence weight vector; and wherein applying a genetic algorithm to the one or more natural weight vectors includes applying a genetic algorithm to the low-confidence natural weight vector and the high-confidence weight vector, thereby generating the synthetic weight vector.

4. The method of claim 1, wherein generating the synthetic weight vector includes:

generating one or more pseudorandom values between a lower threshold and an upper threshold.

5. The method of claim 1, wherein the providing the synthetic voice sample to the utterance-based framework includes:

providing the synthetic voice sample to an activation trigger engine, the activation trigger engine being configured to detect an activation trigger and, in response thereto, transition a speech analysis engine from an inactive state to an active state, wherein the synthetic voice sample includes a representation of a synthetic voice uttering an activation trigger.

6. The method of claim 5, further comprising:

determining a fitness of the activation trigger engine based on comparing an expected output of the activation trigger engine and an actual output of the activation trigger engine responsive to the synthetic voice sample being provided to the activation trigger engine.

7. The method of claim 5, further comprising:

adjusting weights of the activation trigger engine—based on comparing an expected output of the activation trigger engine and an actual output of the activation trigger engine responsive to the synthetic voice sample being provided to the activation trigger engine.

8. The method of claim 1, wherein providing the synthetic voice sample to the utterance-based framework includes:

playing the synthetic voice sample through a speaker to an appliance having the utterance-based framework.

9. The method of claim 1, further comprising:

providing a natural sample to the utterance-based framework as at least one of a testing or training sample.

10. The method of claim 1, further comprising:
obtaining a training set of audio clips;
representing each audio file of the training set of audio clips as a feature vector to form a plurality of feature vectors;
generating the average representation of the vector space from the plurality of feature vectors;
subtracting the average representation of the vector space from the plurality of feature vectors to obtain a mean-centered result; and
performing singular value decomposition based on the mean-centered result to obtain eigenvoices.

11. The method of claim 1, further comprising:
receiving an output from the utterance-based framework regarding whether the synthetic voice sample included an activation trigger.

12. A system comprising:
one or more processors; and
a computer-readable storage medium coupled to the one or more processors and comprising instructions thereon that, when executed by the one or more processors, cause the one or more processors to:
generate a synthetic weight vector associated with a vector space, wherein to generate the synthetic weight vector includes to:
randomly or pseudorandomly generate one or more values between a lower threshold and an upper threshold,
set one or more values of the synthetic weight vector based on the one or more randomly or pseudo-randomly generated values,
determine whether the synthetic weight vector has one or more values that are outside of a range of expected natural weight vectors, and
responsive to determining that the one or more values are outside of the range of expected natural weight vectors, remediating the synthetic weight vector:
add an average representation of the vector space to a product of multiplying the synthetic weight vector and eigenvoices associated with the vector space, thereby forming a synthetic feature vector;
generate a synthetic voice sample based on the synthetic feature vector; and
train an utterance-based framework, wherein to train the utterance-based framework includes to provide the synthetic voice sample to the utterance-based framework as a training audio sample.

13. The system of claim 12,
wherein obtaining the one or more natural weight vectors includes obtaining a low-confidence natural weight vector;
wherein to generate the synthetic weight vector includes:
multiplying one or more values of the low-confidence natural weight vector by one or more of the randomly or pseudorandomly generated values.

14. The system of claim 12, wherein the instructions further cause the one or more processors to:
provide the synthetic voice sample to an activation trigger detection framework, wherein the synthetic voice sample includes a representation of a synthetic voice uttering an activation trigger; and
determine a fitness of the activation trigger detection framework based on comparing an expected output of the activation trigger detection framework and an actual output of the activation trigger detection framework responsive to the synthetic voice sample being provided to the activation trigger detection framework.

15. A non-transitory computer readable medium having instructions stored thereon that, when executed by a processor, cause the processor to:
  generate a synthetic weight vector associated with a vector space;
  add an average representation of the vector space to a product of multiplying the synthetic weight vector and eigenvoices associated with the vector space, thereby forming a synthetic feature vector;
  generate a synthetic voice sample based on the synthetic feature vector using a speech synthesizer; and
  train an utterance-based framework, wherein to train the utterance-based framework includes to provide the synthetic voice sample to the utterance-based framework as a training audio sample;
  wherein generating the synthetic weight vector includes:
    obtaining a low-confidence weight vector,
    obtaining a high-confidence weight vector,
    applying a genetic algorithm to the low-confidence weight vector and the high-confidence weight vector, thereby generating the synthetic weight vector, wherein applying the genetic algorithm includes:
      mutating at least one of the low-confidence weight vector and the high-confidence weight vector associated with a training sample that the utterance-based framework processed incorrectly based on a weight vector associated with a training sample that the utterance-based framework processed correctly.

16. The non-transitory computer-readable medium of claim 15, wherein to generate the synthetic weight vector includes generating the synthetic weight vector based on a training sample that the utterance-based framework processed incorrectly.

17. The method of claim 1, further comprising:
  determining that the synthetic weight vector has one or more values outside of a range expected of natural weight vectors; and
  remediating the synthetic weight vector responsive to the determination that the synthetic weight vector has one or more values outside of a range expected of natural weight vectors.

18. The system of claim 12, wherein the instructions further cause the one or more processors to:
  determine the lower threshold and the upper threshold based on minimum and maximum values, respectively, that one or more natural feature vector values would have in the vector space.

19. The system of claim 12, wherein to set one or more values of the synthetic weight vector based on the one or more randomly or pseudorandomly generated values includes to:
  multiply one or more values of an incorrectly-processed feature vector by the one or more randomly or pseudorandomly generated values.

20. A method for training an utterance-based framework, the method comprising:
  generating a synthetic weight vector associated with a vector space, wherein generating the synthetic weight vector includes:
    obtaining a weight vector associated with a training sample that the utterance-based framework processed incorrectly,
    applying a genetic algorithm to the obtained weight vector associated with a training sample that the utterance-based framework processed incorrectly,
    determining that the synthetic weight vector has one or more values outside of a range expected of natural weight vectors, and
    remediating the synthetic weight vector responsive to the determination that the synthetic weight vector has one or more values outside of a range expected of natural weight vectors;
  adding an average representation of the vector space to a product of multiplying the synthetic weight vector and eigenvoices associated with the vector space, thereby forming a synthetic feature vector;
  generating a synthetic voice sample based on the synthetic feature vector, wherein generating the synthetic voice sample based on the synthetic feature vector includes providing the synthetic feature vector as input to a speech synthesizer; and
  training the utterance-based framework, wherein the training includes providing the synthetic voice sample to the utterance-based framework as a training audio sample.

21. The method of claim 20, wherein applying the genetic algorithm includes:
  applying crossover to: (1) the obtained weight vector associated with the training sample that the utterance-based framework processed incorrectly and (2) one or more weight vectors that the utterance-based framework processed correctly, thereby generating the synthetic weight vector.

22. The method of claim 20,
  wherein obtaining the one or more natural weight vectors includes obtaining a low-confidence natural weight vector;
  wherein generating the synthetic weight vector includes obtaining a high-confidence weight vector; and
  wherein applying a genetic algorithm to the one or more natural weight vectors includes applying a genetic algorithm to the low-confidence natural weight vector and the high-confidence weight vector, thereby generating the synthetic weight vector.

23. The method of claim 20, wherein generating the synthetic weight vector includes:
  generating one or more pseudorandom values between a lower threshold and an upper threshold.

24. The method of claim 20, wherein the providing the synthetic voice sample to the utterance-based framework includes:
  providing the synthetic voice sample to an activation trigger engine, the activation trigger engine being configured to detect an activation trigger and, in response thereto, transition a speech analysis engine from an inactive state to an active state,
  wherein the synthetic voice sample includes a representation of a synthetic voice uttering an activation trigger.

25. The method of claim 24, further comprising:
  determining a fitness of the activation trigger engine based on comparing an expected output of the activation trigger engine and an actual output of the activation trigger engine responsive to the synthetic voice sample being provided to the activation trigger engine.

26. The method of claim 24, further comprising:
  adjusting weights of the activation trigger engine—based on comparing an expected output of the activation trigger engine and an actual output of the activation trigger engine responsive to the synthetic voice sample being provided to the activation trigger engine.

27. The method of claim 20, wherein providing the synthetic voice sample to the utterance-based framework includes:

playing the synthetic voice sample through a speaker to an appliance having the utterance-based framework.

28. The method of claim 20, further comprising:

providing a natural sample to the utterance-based framework as at least one of a testing or training sample.

29. The method of claim 20, further comprising:

obtaining a training set of audio clips;

representing each audio file of the training set of audio clips as a feature vector to form a plurality of feature vectors;

generating the average representation of the vector space from the plurality of feature vectors;

subtracting the average representation of the vector space from the plurality of feature vectors to obtain a mean-centered result; and performing singular value decomposition based on the mean-centered result to obtain eigenvoices.

30. The method of claim 20, further comprising:

receiving an output from the utterance-based framework regarding whether the synthetic voice sample included an activation trigger.

31. The method of claim 20, wherein applying the genetic algorithm to the obtained weight vector associated with a training sample that the utterance-based framework processed incorrectly includes:

mutating the obtained weight vector associated with a training sample that the utterance-based framework processed incorrectly based on a weight vector associated with a training sample that the utterance-based framework processed correctly.

32. A non-transitory computer readable medium having instructions stored thereon that, when executed by a processor, cause the processor to:

generate a synthetic weight vector associated with a vector space;

determine that the synthetic weight vector has one or more values outside of a range expected of natural weight vectors;

remediate the synthetic weight vector responsive to the determination that the synthetic weight vector has one or more values outside of a range expected of natural weight vectors;

add an average representation of the vector space to a product of multiplying the synthetic weight vector and eigenvoices associated with the vector space, thereby forming a synthetic feature vector;

generate a synthetic voice sample based on the synthetic feature vector using a speech synthesizer; and train an utterance-based framework, wherein to train the utterance-based framework includes to provide the synthetic voice sample to the utterance-based framework as a training audio sample;

wherein generating the synthetic weight vector includes:
obtaining a low-confidence weight vector,
obtaining a high-confidence weight vector, and
applying a genetic algorithm to the low-confidence weight vector and the high-confidence weight vector, thereby generating the synthetic weight vector.

33. The non-transitory computer-readable medium of claim 32, wherein to generate the synthetic weight vector includes generating the synthetic weight vector based on a training sample that the utterance-based framework processed incorrectly.

* * * * *

UNITED STATES PATENT AND TRADEMARK OFFICE
CERTIFICATE OF CORRECTION

PATENT NO. : 10,943,581 B2
APPLICATION NO. : 16/168478
DATED : March 9, 2021
INVENTOR(S) : Daniel Bromand Page 1 of 1

It is certified that error appears in the above-identified patent and that said Letters Patent is hereby corrected as shown below:

On the Title Page

Item (57), ABSTRACT
Line 2, "utterance based" should read --utterance-based--.

In the Specification

Column 2
Line 11, insert paragraph break between "speech-based frameworks." and "Oord, et al.".

Column 14
Line 33, "utterance based" should read --utterance-based--.

In the Claims

Column 25
Line 55, "engine-based" should read --engine based--.

Column 26
Line 37, "vector:" should read --vector;--.

Column 28
Line 63, "engine-based" should read --engine based--.

Column 30
Line 28, "computer-readable" should read --computer readable--.

Signed and Sealed this
First Day of June, 2021

Drew Hirshfeld
*Performing the Functions and Duties of the*
*Under Secretary of Commerce for Intellectual Property and*
*Director of the United States Patent and Trademark Office*